US012633257B2

(12) United States Patent
Hong et al.

(10) Patent No.: US 12,633,257 B2
(45) Date of Patent: May 19, 2026

(54) LIGHT EMITTING DISPLAY DEVICE

(71) Applicant: Samsung Display Co., LTD., Yongin-si (KR)

(72) Inventors: Sung Jin Hong, Seoul (KR); Hye Won Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 666 days.

(21) Appl. No.: 17/862,999

(22) Filed: Jul. 12, 2022

(65) Prior Publication Data

US 2023/0162676 A1 May 25, 2023

(30) Foreign Application Priority Data

Nov. 19, 2021 (KR) ........................ 10-2021-0160314

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0426* (2013.01);
(Continued)

(58) Field of Classification Search
CPC ........... H10K 59/1216; H10K 59/1213; H10K 59/126; H10K 59/65; G09G 3/3233; G09G 2310/0251; G09G 2300/0861; G09G 2310/08; G09G 2300/0842; G09G 2300/0408; H10D 86/423; H10D 86/60
See application file for complete search history.

(56) References Cited

U.S. PATENT DOCUMENTS

| | | | | |
|---|---|---|---|---|
| 12,029,075 B2 * | 7/2024 | Matsueda | .......... | H10K 59/1213 |
| 2002/0009890 A1 * | 1/2002 | Hayase | ................. | G02F 1/1368 257/E21.414 |

(Continued)

FOREIGN PATENT DOCUMENTS

| | | |
|---|---|---|
| KR | 10-2013-0007065 | 1/2013 |
| KR | 10-2017-0136128 | 12/2017 |

(Continued)

OTHER PUBLICATIONS

Korean Office Action dated Feb. 17, 2025, in Korean Patent Application No. 10-2021-0160314.

*Primary Examiner* — Shaheda A Abdin
(74) *Attorney, Agent, or Firm* — Sughrue Mion, PLLC

(57) ABSTRACT

A light emitting display device includes a first pixel positioned in a first display area, the first pixel including a first driving circuit part including a first boost capacitor, and a first driving transistor, and a first light-emitting element; a second pixel positioned in a second display area, the second pixel including a second driving circuit part including a second boost capacitor, and a second driving transistor, and a second light-emitting element; and a third pixel positioned in a third display area positioned at a boundary part of the first display area and the second display area, the third pixel including a third driving circuit part including a third boost capacitor, and a third driving transistor, and a third light-emitting element, wherein the first boost capacitor, the second boost capacitor, and the third boost capacitor have different capacitance values.

20 Claims, 26 Drawing Sheets

(52) U.S. Cl.
CPC ............... *G09G 2300/0819* (2013.01); *G09G 2300/0842* (2013.01); *G09G 2300/0861* (2013.01); *G09G 2320/0626* (2013.01); *G09G 2354/00* (2013.01)

(56) References Cited

U.S. PATENT DOCUMENTS

| | | | | |
|---|---|---|---|---|
| 2007/0040770 | A1* | 2/2007 | Kim | G09G 3/3291<br>345/76 |
| 2008/0203931 | A1* | 8/2008 | Kim | G09G 3/3233<br>445/24 |
| 2009/0026454 | A1* | 1/2009 | Kurokawa | G02F 1/136204<br>257/E33.001 |
| 2015/0199932 | A1* | 7/2015 | Ohara | G09G 3/3258<br>345/212 |
| 2015/0287361 | A1* | 10/2015 | Lee | G09G 3/3233<br>315/172 |
| 2017/0345367 | A1* | 11/2017 | Ka | H10K 59/1213 |
| 2018/0047799 | A1* | 2/2018 | Lim | H10K 59/88 |
| 2021/0249498 | A1* | 8/2021 | Cho | H10K 50/80 |
| 2021/0265449 | A1* | 8/2021 | Son | H10K 59/126 |
| 2021/0272985 | A1* | 9/2021 | Kim | H01L 27/124 |
| 2021/0280127 | A1* | 9/2021 | An | H01L 33/62 |
| 2021/0359056 | A1* | 11/2021 | Lee | H10K 59/131 |
| 2021/0359066 | A1* | 11/2021 | An | H01L 27/124 |
| 2022/0044634 | A1* | 2/2022 | Ka | G09G 3/3291 |
| 2023/0020926 | A1 | 1/2023 | Park et al. | |

FOREIGN PATENT DOCUMENTS

| | | |
|---|---|---|
| KR | 10-2018-0018960 | 2/2018 |
| KR | 10-2021-0085377 | 7/2021 |
| KR | 10-2021-0098091 | 8/2021 |
| KR | 10-2021-0109709 | 9/2021 |
| KR | 10-2023-0010082 | 1/2023 |

* cited by examiner

| Model | Embodiment 1 | Embodiment 2 | Embodiment 3 |
|---|---|---|---|
| Layout |  |  |  |
| T1 W/L | 5.1 x 12.8(㎛) | | |
| Cst | SAME (50fF) | | |
| Cnb | 4.1fF | 4.3fF | 4.5fF |

| | T1 W/L | Cst | Cnb | Black |
|---|---|---|---|---|
| Embodiment 1 | | | 4.1fF |  |
| Embodiment 2 | 5.1 /12.8(μm) | 50fF | 4.3fF |  |
| Embodiment 3 | | | 4.5fF |  |

LIGHT EMITTING DISPLAY DEVICE

CROSS-REFERENCE TO RELATED APPLICATION(S)

This application claims priority to and benefits of Korean Patent Application No. 10-2021-0160314 under 35 U.S.C. § 119, filed in the Korean Intellectual Property Office on Nov. 19, 2021, the entire contents of which are incorporated herein by reference.

BACKGROUND

1. Technical Field

The disclosure relates to a light emitting display device, and more specifically, to a light emitting display device in which a light-emitting element is also positioned on a driving unit.

2. Description of the Related Art

The display device may include a display area in which a screen is displayed and a peripheral area in which a screen is not displayed. Pixels may be disposed in a row direction and a column direction on the display area. In each pixel, various elements such as transistors and capacitors and various wires that may supply signals to the elements may be positioned. Various driving parts (e.g., a scan driver, a data driver, a timing controller, or the like) and wires that transmit electrical signals to drive the pixels may be positioned in the peripheral area.

Although there is an increasing demand for reducing the magnitude of the peripheral area and expanding the display area, there is a problem at least in that it is difficult to reduce the magnitude of the peripheral area because the area occupied by the driving unit increases in the process of realizing high resolution and high speed driving.

The above information disclosed in this Background section is only for enhancement of understanding of the background of the described technology, and therefore it may contain information that does not form the prior art that is already known in this country to a person of ordinary skill in the art.

SUMMARY

Embodiments are for providing a display device with an extended display area. Embodiments are for preventing a boundary between the display areas from being recognized by a user in the display device with the extended display area. However, embodiments of the disclosure are not limited to those set forth herein. The above and other embodiments will become more apparent to one of ordinary skill in the art to which the disclosure pertains by referencing the detailed description of the disclosure given below.

A light emitting display device according to an embodiment includes a first pixel positioned in a first display area, the first pixel including a first driving circuit part including a first boost capacitor, and a first driving transistor, and a first light-emitting element; a second pixel positioned in a second display area, the second pixel including a second driving circuit part including a second boost capacitor, and a second driving transistor, and a second light-emitting element; and a third pixel positioned in a third display area positioned at a boundary part of the first display area and the second display area, and the third pixel including a third driving circuit part including a third boost capacitor, and a third driving transistor, and a third light-emitting element, wherein the first boost capacitor, the second boost capacitor, and the third boost capacitor have different capacitance values.

The third boost capacitor may have a capacitance value greater than a capacitance value of the first boost capacitor or a capacitance value of the second boost capacitor.

The third display area may have a first pixel in addition to the third pixel.

The capacitance value of the third boost capacitor of the third pixel may be greater than the capacitance value of the first boost capacitor of the first pixel.

A magnitude of the second driving transistor of the second pixel may be greater than a magnitude of the first driving transistor and a magnitude of the third driving transistor, and the magnitude of the first driving transistor and the magnitude of the third driving transistor may be equal to each other.

The second pixel may be further positioned in the third display area.

The capacitance value of the third boost capacitor of the third pixel may be greater than the capacitance value of the second boost capacitor of the second pixel.

A magnitude of the second driving transistor of the second pixel may be greater than a magnitude of the first driving transistor, and the magnitude of the second driving transistor of the second pixel may be equal to a magnitude of the third driving transistor.

The first pixel, the second pixel, and the third pixel may each further include a second transistor transmitting a data voltage, and a third transistor connecting a gate electrode and a second electrode of each of the first driving transistor, the second driving transistor, and the third driving transistor, and each of the first boost capacitor, the second boost capacitor, and the third boost capacitor may be formed between the gate electrode and the second electrode of the third transistor, and each of the first boost capacitor, the second boost capacitor, and the third boost capacitor may also be electrically connected to the gate electrode of each of the first driving transistor, the second driving transistor, and the third driving transistor.

Each of the first driving transistor, the second driving transistor, and the third driving transistor, and the second transistor may each be a p-type transistor, and the third transistor may be an n-type transistor.

The second display area may be divided into an overlapping region where the second driving circuit part and the second light-emitting element overlap each other in a plan view, and a non-overlapping region where the second driving circuit part and the second light-emitting element do not overlap each other in a plan view.

The second light-emitting element positioned in the non-overlapping region may overlap the driving part including a scan driver in a plan view.

The first light-emitting element, the second light-emitting element, and the third light-emitting element may display a same color and may have a same magnitude in a plan view.

The second driving circuit part may be electrically connected to one or more of the second light-emitting element.

A light emitting display device according to an embodiment includes a polycrystalline semiconductor layer on a substrate; a first gate conductive layer positioned over the polycrystalline semiconductor layer and electrically insulated from the polycrystalline semiconductor layer, the first gate conductive layer including a gate electrode of a driving transistor and a first scan line; a second gate conductive layer positioned over the first gate conductive layer and electrically insulated from the first gate conductive layer, the second gate conductive layer including a first storage electrode for a storage capacitor; an oxide semiconductor layer positioned over the second gate conductive layer and electrically insulated from the second gate conductive layer; a third gate conductive layer positioned over the oxide semiconductor layer and electrically insulated from the oxide semiconductor layer, the third gate conductive layer including a second scan line; a first data conductive layer positioned over the second gate conductive layer and electrically insulated from the second gate conductive layer, the first data conductive layer including a first connecting member electrically connecting the oxide semiconductor layer and the gate electrode of the driving transistor; and a second data conductive layer electrically insulated from the data conductive layer and positioned over the first data conductive layer, the second data conductive layer including a data line and a driving voltage line, wherein the first connecting member has a protruded part extending along the second scan line.

A boost capacitor may be formed where the first connecting member, the protruded part, and the second scan line overlap each other in a plan view.

The first storage electrode may have an opening, and the first connecting member is electrically connected to the gate electrode of the driving transistor through the opening.

The first storage electrode may overlap the gate electrode of the driving transistor in a plan view to form the storage capacitor.

The light emitting display device may further include an anode positioned on the second data conductive layer, and the anode may overlap in a plan view a driving part including a scan driver that generates a scan signal to the first scan line or the second scan line.

Another first connecting member adjacent to the first connecting member may not have a protruded part extending along the second scan line as the protruded part of the first connecting member.

According to embodiments, the display area may be expanded by positioning the light-emitting element on the driving part.

According to embodiments, the driving circuit part having a relatively large boost capacitor may be formed between the normal display area and the display area extended above the driving part in the display panel. Thus, the difference in luminance may not occur or occur less in the boundary part between the display areas. Therefore, the user may not see the boundary part, and the display quality may be improved.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
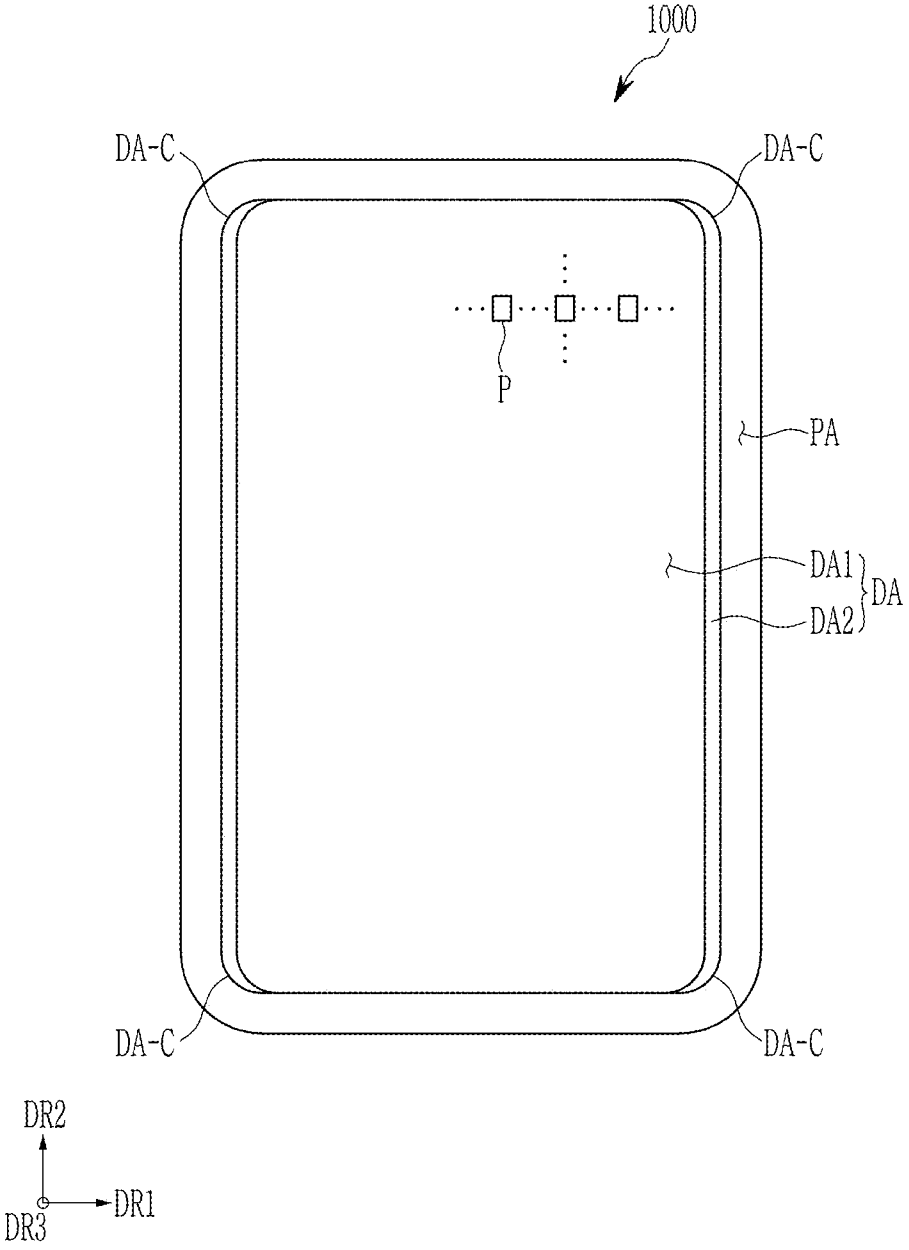
FIG. 1 is a schematic plan view of a display device according to an embodiment.

In the following description, for the purpose explanation, numerous specific details are set forth in order to provide a thorough understanding of various embodiments or implementations of the disclosure. As used herein “embodiments” and “implementations” are interchangeable words that are non-limiting examples of devices or methods described herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Therefore, unless otherwise specified, the features, components, modules, layers, films, panels, regions, and/or aspects, etc. (hereinafter individually or collectively referred to as “elements”), of the various embodiments may be otherwise combined, separated, interchanged, and/or rearranged without departing from the inventive concepts.

Like reference numerals denote like elements throughout the specification.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

When an element such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprise," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The display surface may be parallel to a surface defined by a first direction DR1 and a second direction DR2. A normal direction of the display surface, i.e., a thickness direction of the display device DD, may indicate a third direction DR3. Further, in the specification, an expression of "when viewed from a plane or on a plane" may represent a case when viewed in the third direction. Hereinafter, a front surface (or a top surface) and a rear surface (or a bottom surface) of each layers or units may be distinguished by the third direction DR3. However, directions indicated by the first to third directions DR1, DR2, and DR3 may be a relative concept, and converted with respect to each other, e.g., converted into opposite directions.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuit, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions disclosed herein and may optically be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Also, throughout the specification, when it is said that parts such as a wire, a layer, a film, a region, a plate, and a constituent element are "extended in a direction", this does not mean only a straight line shape extending straight in the corresponding direction, but also includes a structure that is bent in a part, has a zigzag structure, or extends while including a curved line structure as a structure that extends overall in the direction.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Electronic devices (e.g., a mobile phone, TV, a monitor, a laptop computer, etc.) included in display devices and display panels described in the specification, or electronic devices included in display devices and display panels, etc. manufactured by manufacturing methods described in a specification are not excluded from a scope of this specification.

Figure 2:
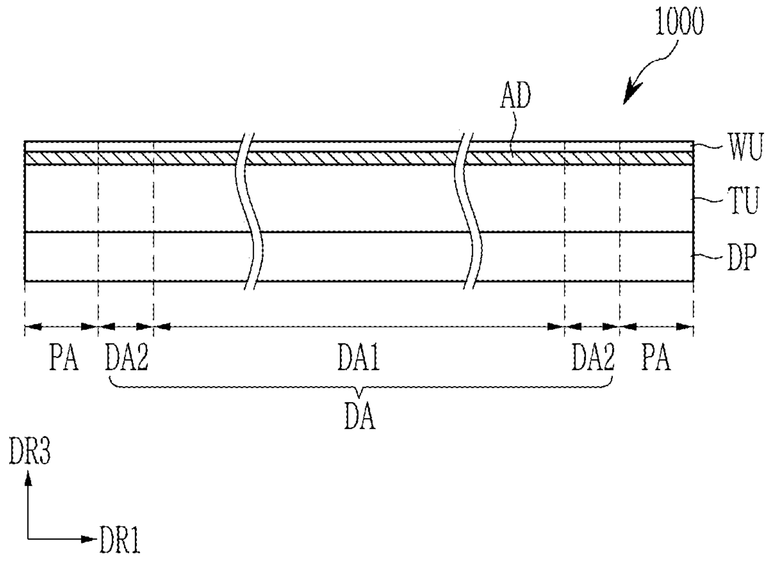
FIG. 2 is a schematic cross-sectional view of a display device according to an embodiment.

FIG. 1 is a schematic plan view of a display device according to an embodiment, and FIG. 2 is a schematic cross-sectional view of a display device according to an embodiment.

Referring to FIG. 1, a display device 1000 according to an embodiment may include a display area DA in which pixels P are disposed and an image is displayed, and a non-display area PA adjacent to the display area DA. The non-display area PA may be a region where an image is not displayed.

The display area DA may have a rectangular shape as an example. According to an embodiment, as illustrated in FIG. 1, each corner DA-C of the display area DA may have a round shape. The non-display area PA may have a shape surrounding the display area DA. However, the disclosure is not limited thereto, and the shapes of the display area DA and the non-display area PA may be designed in various ways.

The display area DA may include a first display area DA1 and a second display area DA2 positioned between the first display area DA1 and the non-display area PA.

The first display area DA1 may be positioned at a center of the display area DA, and the second display area DA2 may be positioned on sides (e.g., both sides) of the first display area DA1. For example, the second display area DA2 may be positioned on left and right of the first display area DA1. However, the disclosure is not limited thereto, and positions of the first display area DA1 and the second display area DA2 may be variously changed. For example, the first display area DA1 may have a substantially quadrangle shape, and the second display area DA2 may surround four corners of the first display area DA1.

Figure 12:
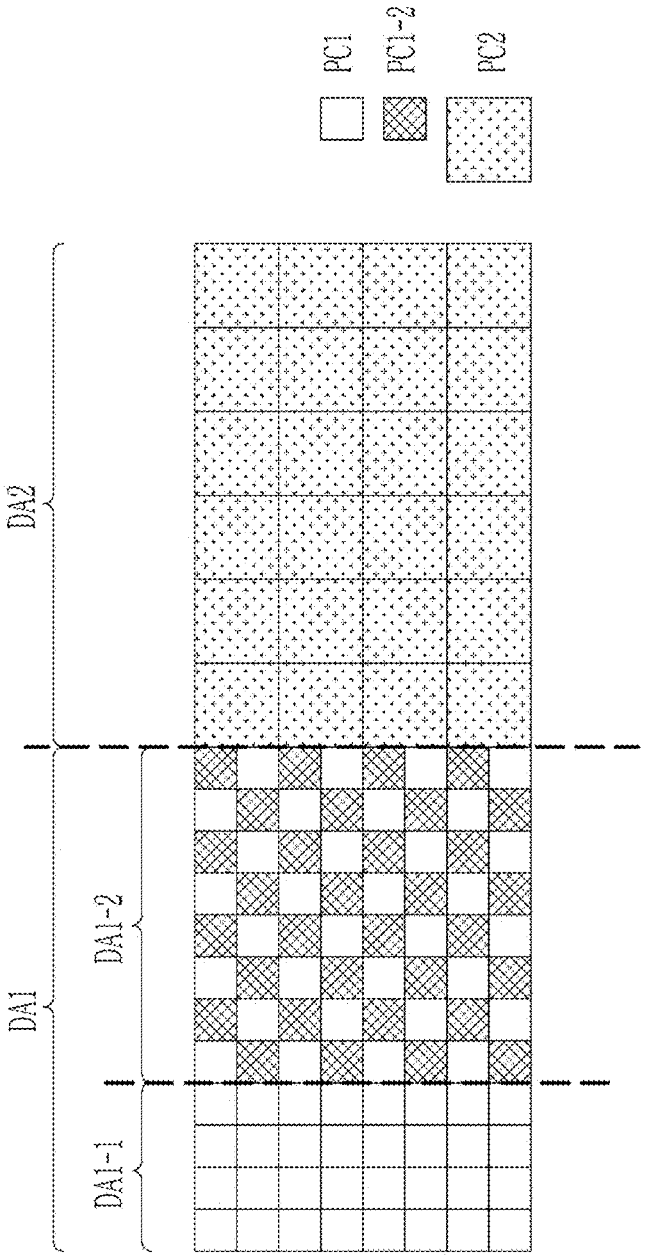
FIG. 12 is a schematic view showing a pixel arrangement of a display panel according to an embodiment.
Figure 15:
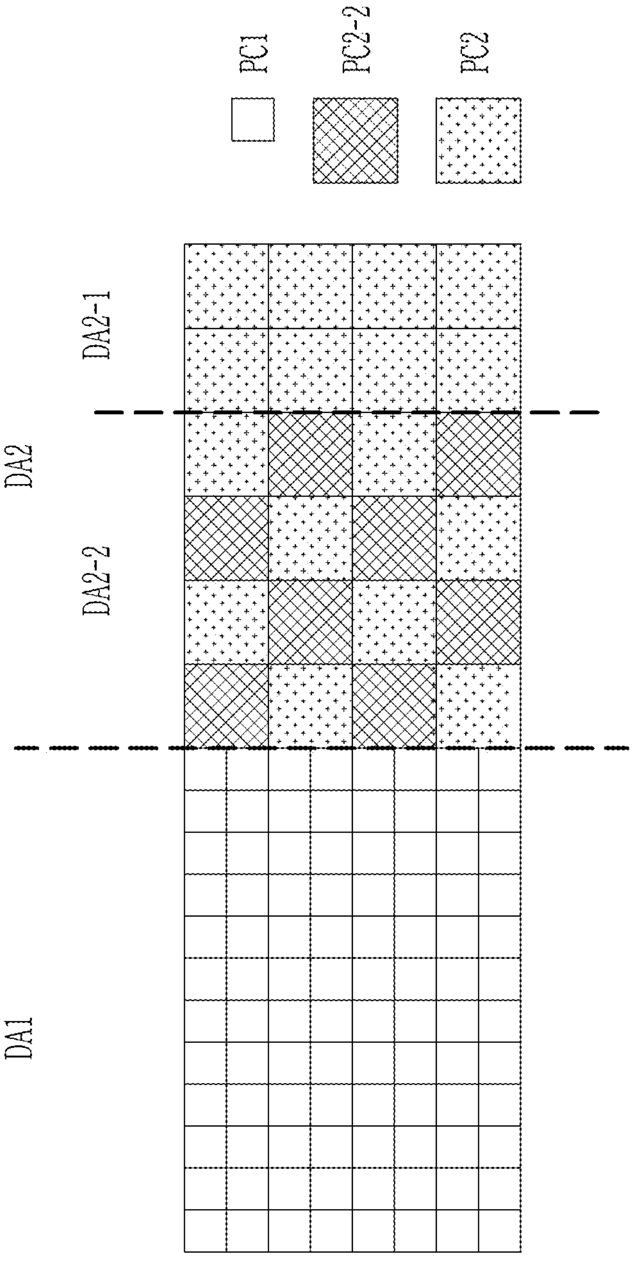
FIG. 15 is a schematic view showing a pixel arrangement of a display panel according to another embodiment.

A third display area referred to as DA1-2 shown in FIG. 12 (or DA2-2 shown in FIG. 15) may be positioned in a boundary part between the first display area DA1 and the second display area DA2. The third display area DA1-2 may be positioned in the first display area DA1 as shown in FIG. 12. In some embodiments, the third display area DA2-2 may be positioned in the second display area DA2 as shown in FIG. 15. According to an embodiment, a separate display area may be disposed between the first display area DA1 and the second display area DA2. The third display area (e.g., DA1-2 of FIG. 12 or DA2-2 of FIG. 15) may display an intermediate luminance between the first display area DA1 and the second display area DA2. The first display area DA1, the second display area DA2, and the third display area may have shapes corresponding to the rounded corners DA-C of the display area DA.

The non-display area PA may have a shape surrounding the display area DA. The non-display area PA may be the region in which an image is not displayed, and may be positioned at an outer portion of the display device 1000. At least a portion of the display device 1000 according to an embodiment may include a bent part that is bent. For example, the central portion of the display device 1000 may be flat, and an edge portion may have a bent shape. At least a portion of the second display area DA2 may be positioned on the bent part, and at least a portion of the second display area DA2 may have the bent shape.

On the display device 1000, a surface on which the image is displayed is parallel to a surface defined by the first direction DR1 and the second direction DR2. The third direction DR3 indicates a normal direction (e.g., thickness direction of display device 1000) of the surface on which the image is displayed. The front (or top) and back (or bottom) of each member may be distinguished by the third direction DR3. However, the directions indicated by the first to third directions DR1, DR2, and DR3 are relative concepts and may be converted to other directions.

Referring to FIG. 2, the display device 1000 may include a display panel DP, a touch part TU positioned on the display panel DP, and a cover window WU positioned on the touch part TU.

The display panel DP may be a flat rigid display panel or a flexible display panel. However, the disclosure is not limited thereto. The display panel DP according to an embodiment may be a light emitting display panel, and is not limited thereto. For example, the display panel DP may be an organic light emitting panel or a quantum dot light emitting display panel. The emission layer of the organic light emitting panel may include an organic light emitting material. The emission layer of the quantum dot light emitting display panel may include quantum dots and quantum rods. Hereinafter, the display panel DP is described as the organic light emitting panel.

The touch part TU may be disposed on the display panel DP for a touchscreen function of the display device 1000. The touch part TU may include a touch electrode of various patterns, and may be a resistive type or a capacitive type.

The cover window WU may be positioned on the display panel DP and the touch part TU. The cover window WU may be positioned on and protect the display panel DP and the touch part TU. The cover window WU may define an appearance of the display device 1000.

An adhesive layer AD adhering the touch part TU and the cover window WU may be disposed between the touch part TU and the cover window WU. Although not shown in this specification, a light blocking member and a color filter may be positioned on the touch part TU, and a polarizer may be attached on the cover window WU.

The detailed structure of the display panel DP is further described with reference to FIGS. 3 and 4.

Figure 3:
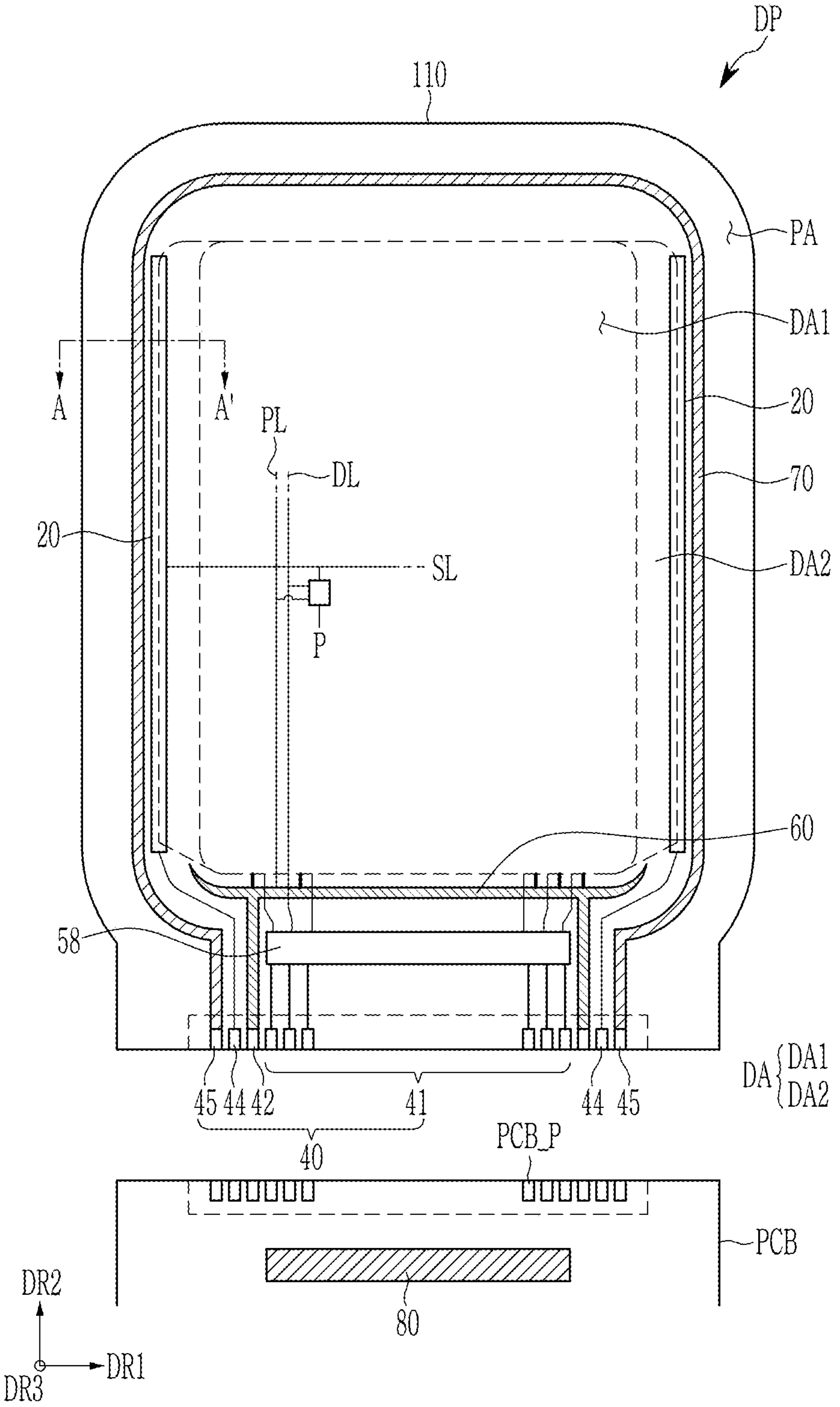
FIG. 3 is a schematic plan view of a display panel including constituent elements positioned in a non-display area.
Figure 4:
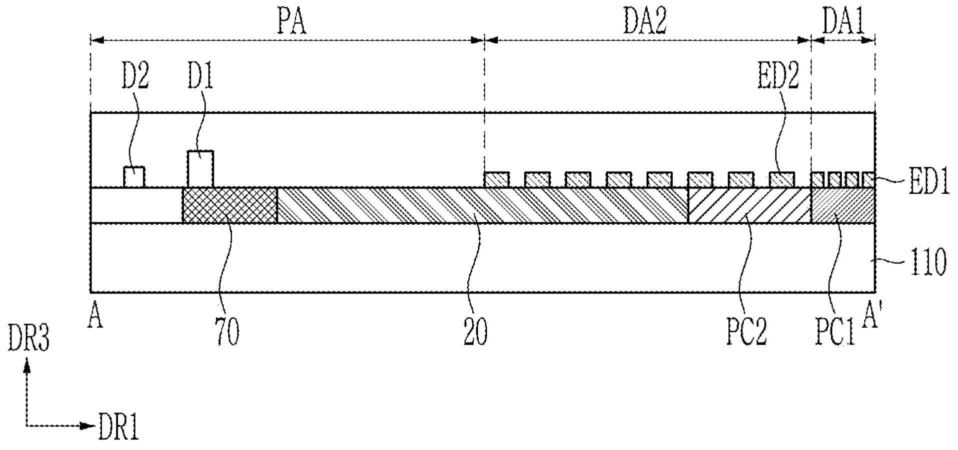
FIG. 4 is a schematic cross-sectional view taken along line A-A' of FIG. 3.

FIG. 3 is a schematic plan view of a display panel including constituent elements positioned in a non-display area, and FIG. 4 is a schematic cross-sectional view taken along line A-A' of FIG. 3.

Referring to FIG. 3, the display panel DP may include a display area DA and a non-display area PA corresponding to the display area DA and the non-display area PA of the display device 1000 described in FIG. 1. The non-display area PA may be positioned along a border of the display area DA. Although the non-display area PA of FIG. 3 is widely enlarged, the actual non-display area PA may be formed very narrowly.

The display panel DP may include pixels P. The pixels P may be positioned within the display area DA, and each pixel P may include a light-emitting element and a driving circuit part electrically connected to the light-emitting element. In some regions (e.g., overlapping regions) of the display area DA, the driving circuit part and the light-emitting element electrically connected to the driving circuit may overlap each other in a plan view. However, in some regions (e.g., non-overlapping regions) of the display area DA, the driving circuit part and the light-emitting element electrically connected to the driving circuit part may be separated without overlapping in a plan view. The light-emitting element that does not overlap the driving circuit part in a plan view may overlap a scan driver 20 or a data driver 58 in a plan view. The pixel P including a light-emitting element that does not overlap the driving circuit part in a plan view may be included in the second display area DA2. The driving circuit part and the light-emitting element electrically connected to the driving circuit part may overlap each other in a plan view in all pixels P included in the first display area DA1.

Each pixel P may emit light of various colors (e.g., red, green, blue, or white). Each pixel P may include, for example, an organic light emitting diode. The display panel DP may provide an image using the light emitted from the pixels P, and the display area DA may be defined by the pixels P. In this specification, the non-display area PA indicates a region that does not provide the image, and the light-emitting elements are not disposed in the non-display area PA.

The display panel DP may include signal lines and a pad part 40. The signal lines may include a scan line SL extending in the first direction DR1, a data line DL and a driving voltage line PL extending in the second direction DR2, and the like.

The scan driver 20 may be positioned over the display area DA and the non-display area PA on a substrate 110 (e.g., refer to FIG. 4). For example, the scan driver 20 may overlap at least a part of the second display area DA2 and at least a part of the non-display area PA in a plan view.

The scan driver 20 may generate and transmit a scan signal to each pixel P through the scan line SL. According to an embodiment, the scan driver 20 may be disposed to the left and right sides of the display area DA. In the specification, the scan driver 20 is disposed on sides (e.g., both sides) of the substrate 110. In another embodiment, the scan driver may be disposed only on a side of the substrate 110 (e.g., refer to FIG. 4).

The pad part 40 may be disposed to an end of the display panel DP, and include terminals 41, 42, 44, and 45. The pad part 40 may be exposed, and not covered by the insulating layer. The pad part 40 may be electrically connected to a printed circuit board PCB. The pad part 40 may be electrically connected to a pad part PCB_P of the printed circuit board PCB. The printed circuit board PCB may transmit a signal of an IC driving chip 80 or power to the pad part 40.

A controller may change image signals transmitted from the outside into image data signals, and transmit the changed signals (e.g., image data signals) to the data driver 58 through the terminal 41. The controller may receive a vertical synchronization signal, a horizontal synchronizing signal, and a clock signal. The controller may generate a control signal to control the operation of the scan driver 20 and the data driver 58 to be respectively transmitted through the terminals 44 and 41. The controller may transmit a driving voltage ELVDD to a driving voltage supply line 60 through the terminal 42. The controller may also transmit a driving low voltage ELVSS to each of common voltage supply lines 70 through the terminal 45.

The data driver 58 may be disposed on the non-display area PA. The data driver 58 may generate a data signal and transmit the data signal to each pixel P through the data line DL. For example, the data driver 58 may be disposed on a side of the display panel DP, and may be disposed between the pad part 40 and the display area DA.

The driving voltage supply line 60 may be disposed on the non-display area PA. For example, the driving voltage supply line 60 may be disposed between the data driver 58 and the display area DA. The driving voltage supply line 60 may provide the driving voltage ELVDD to the pixels P. The driving voltage supply line 60 may be disposed in the first direction DR1 and may be electrically connected to multiple driving voltage lines PL disposed in the second direction DR2.

The common voltage supply line 70 may be disposed on the non-display area PA. The common voltage supply line 70 may have a shape surrounding the substrate 110 (e.g., refer to FIG. 4). The common voltage supply line 70 may transmit the driving low voltage ELVSS to an electrode (e.g., common electrode) of the light-emitting element included in the pixel P.

The display area DA according to an embodiment may include a first display area DA1 and a second display area DA2. The non-display area PA may correspond to an outer region of the first display area DA1 and the second display area DA2. The second display area DA2 may overlap at least part of the scan driver 20 in a plan view. The display area DA may correspond to a region where the light-emitting element is positioned and light is emitted. The scan driver 20 may be positioned below the light-emitting element.

Referring to FIG. 4, a first pixel included in the first display area DA1 may include a first light-emitting element ED1 and a first driving circuit part PC1 supplying a current to the first light-emitting element ED1. A second pixel included in the second display area DA2 may include a second light-emitting element ED2 and a second driving circuit part PC2 supplying a current to the second light-emitting element ED2.

The first driving circuit part PC1, the second driving circuit part PC2, the scan driver 20, and the common voltage supply line 70 may be positioned on the substrate 110. The first driving circuit part PC1, the second driving circuit part PC2, the scan driver 20, and the common voltage supply line 70 may be disposed in order (or in sequence). Dams D1 and D2 may be positioned in the non-display area PA.

In the first display area DA1, the first light-emitting element ED1 may be positioned on the first driving circuit part PC1, thereby having the overlapping structure in a plan view. For example, the first light-emitting element ED1 and the first driving circuit part PC1 may overlap each other in the first display area DA1.

The second display area DA2 may include a region in which the second light-emitting element ED2 is positioned. The second light-emitting element ED2 may overlap the scan driver 20 and the second driving circuit part PC2 in a plan view. Therefore, the second display area DA2, like the first display area DA1, may be divided (e.g., largely divided) into a region (hereinafter, referred to as overlapping region)

where the second light-emitting element ED2 overlaps the second driving circuit part PC2 supplying a current to the corresponding second light-emitting element ED2 in a plan view, and a region (hereinafter, referred to as non-overlapping region) where the second light-emitting element ED2 does not overlap the second driving circuit part PC2 supplying the current to the corresponding second light-emitting element ED2 in a plan view. For example, the second display area DA2 may be divided into the overlapping region and the non-overlapping region. The second light-emitting element ED2 may overlap the second driving circuit part PC2 in the overlapping region of the second display area DA2. The second light-emitting element ED2 may not overlap the second driving circuit part PC2 in the non-overlapping region of the second display area DA2. The non-overlapping region of the second display area DA2 may be a region where the second light-emitting element ED2 overlaps the driving part such as the scan driver 20 in a plan view.

In FIG. 4, about half of the scan driver 20 corresponds to the non-display area PA, but the disclosure is not limited thereto. In an embodiment, the second light-emitting element ED2 may be positioned on all or most of the scan driver 20, and the second display area DA2 may be formed widely.

The third display area referred to as DA1-2 of FIG. 12 or DA2-2 of FIG. 15 may be positioned on the boundary part between the first display area DA1 and the second display area DA2. The third display area DA1-2, as shown in FIG. 12, may be positioned in the first display area DA1. In some embodiments, as shown in FIG. 15, the third display area DA2-2 may be positioned in the second display area DA2. According to an embodiment, a separate display area may be disposed between the first display area DA1 and the second display area DA2.

Hereinafter, the arrangement of the light-emitting element and the driving circuit part is described in more detail with reference to FIGS. 5 and 6.

Figure 5:
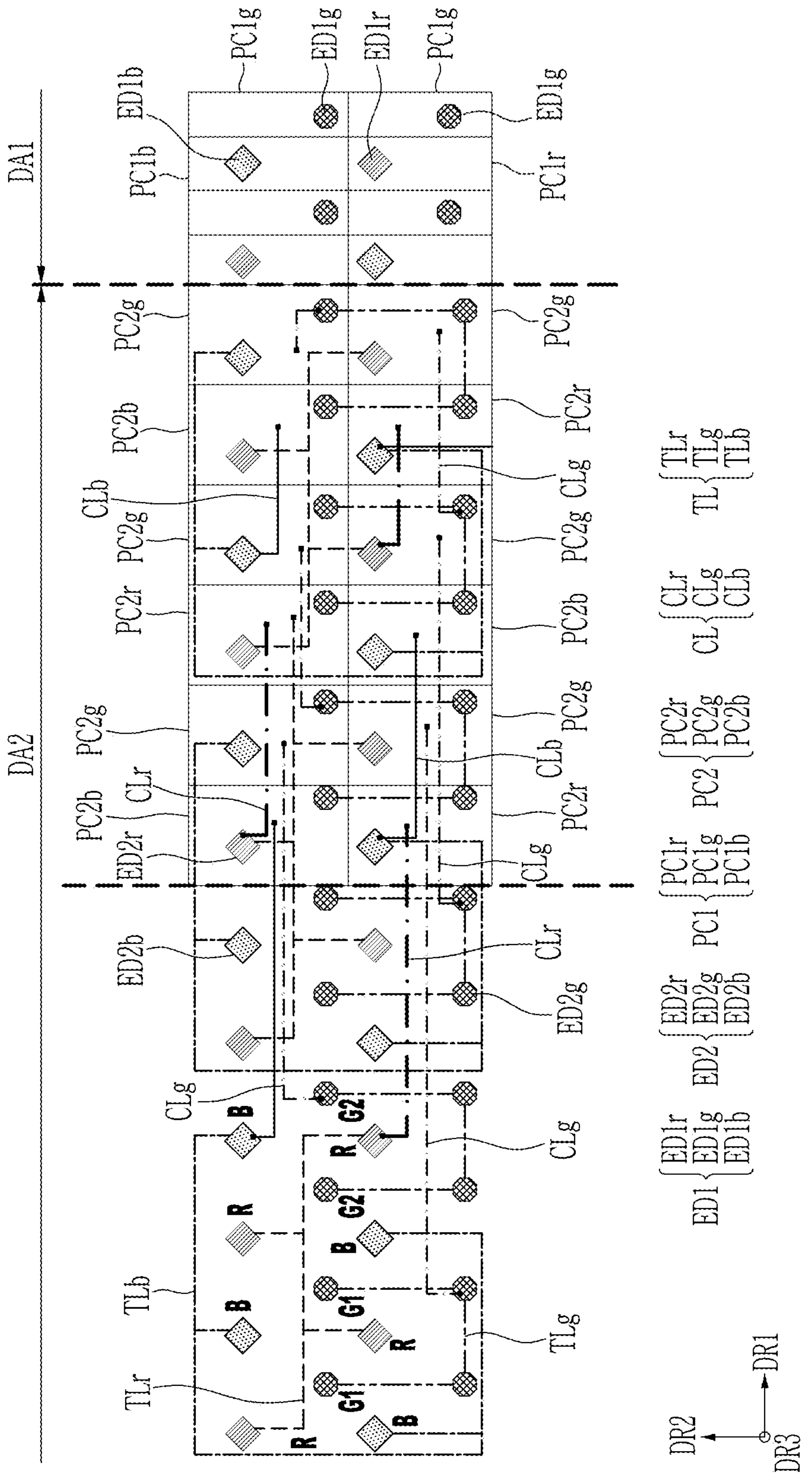
FIG. 5 is a schematic plan view showing a connection between a driving circuit part and a light-emitting element according to an embodiment.
Figure 6:
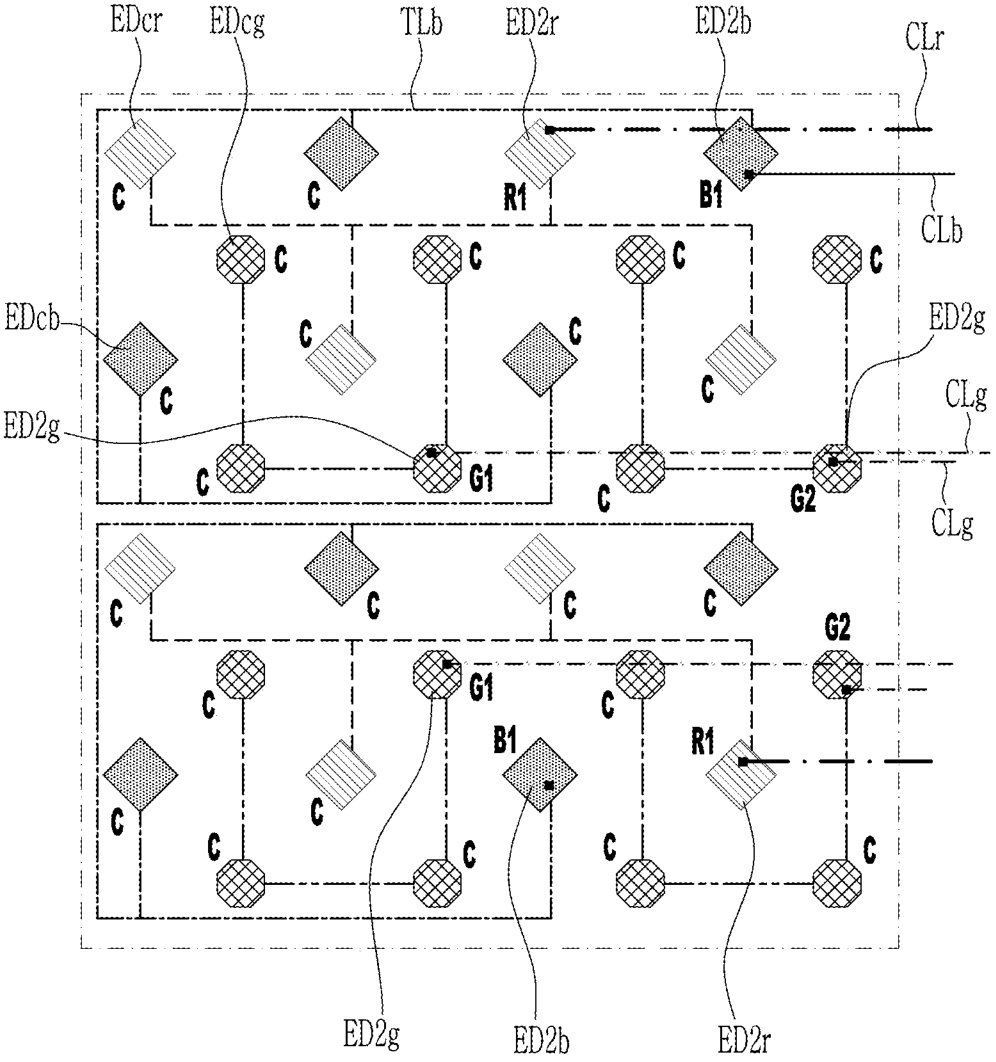
FIG. 6 is a schematic enlarged plan view of a connection of a driving circuit part and a light-emitting element in a second display area of an embodiment of FIG. 5.

FIG. 5 is a schematic plan view showing a connection between a driving circuit part and a light-emitting element according to an embodiment, and FIG. 6 is schematic enlarged plan view of connection of a driving circuit part and a light-emitting element in a second display area of an embodiment of FIG. 5.

In FIG. 5, a region of the display area DA, which is adjacent to the non-display area PA, is illustrated. The second display area DA2 may be positioned adjacent to the non-display area PA, and the first display area DA1 may be positioned inside of the display area DA.

The first pixel included in the first display area DA1 may include the first light-emitting element ED1 and the first driving circuit part PC1 supplying the current. The second pixel included in the second display area DA2 may include the second light-emitting element ED2 and the second driving circuit part PC2 supplying the current.

In FIG. 5, the second display area DA2 may be divided into two regions (e.g., overlapping region and non-overlapping region) by a dotted line. The second driving circuit part PC2 may be positioned in the second display area DA2 positioned to the right of the dotted line, and the overlapping region may be a region where the second light-emitting element ED2 and the second driving circuit part PC2 overlap each other in a plan view. In the second display area DA2 positioned to the left of the dotted line, the second driving circuit part PC2 may not be positioned, and only the second light-emitting element ED2 may be positioned in a plan view. The non-overlapping region may be a region where the second light-emitting element ED2 and the second driving circuit part PC2 may not overlap each other in a plan view.

In the first display area DA1 of FIG. 5, the first driving circuit part PC1 and the first light-emitting element ED1 may be positioned. The first driving circuit part PC1 may be electrically connected to the first light-emitting element ED1 disposed on an upper side of the first driving circuit part PC1. Thus, the first driving circuit part PC1 may supply the current to the first light-emitting element ED1. A region from which light is emitted by the first light-emitting element ED1 may correspond to the first display area DA1.

The second display area DA2 of FIG. 5 may be a region in which light is emitted by the second light-emitting element ED2, and the driving part such as the second driving circuit part PC2, the second light-emitting element ED2, and the scan driver 20 may be positioned. The second driving circuit part PC2 may be electrically connected to the second light-emitting element ED2, and the second driving circuit part PC2 may supply the current to the second light-emitting element ED2. A region where light is emitted by the second light-emitting element ED2 may correspond to the second display area DA2. The second light-emitting element ED2 positioned in the second display area DA2 may be divided into the second light-emitting element ED2 positioned on the second driving circuit part PC2 and the second light-emitting element ED2 positioned on the driving part such as the scan driver 20. For example, a part (or portion) of the second light-emitting elements ED2 may be positioned on the second driving circuit part PC2, and another part (or portion) of the second light-emitting element ED2 may be positioned on the driving part such as the scan driver 20.

According to the structure as described above, since the light-emitting element ED2 may also be positioned in the region where the driving part such as the scan driver 20 is formed, and the display area DA having the extended area may be formed. According to the embodiment, a driving circuit part may be electrically connected to at least one scan line to generate a more accurate current and provide the accurate current to the light-emitting element, and the area occupied by the scan driver 20 may be increased. However, in the embodiment, the second light-emitting element ED2 may also be positioned on the scan driver 20 to be included in the display area DA. Thus, the display area DA may not be reduced, and the larger display area DA may be provided (or secured).

Referring to FIG. 5, the area occupied by each of the first driving circuit parts PC1 and the area occupied by each of the second driving circuit parts PC2 may be different, and the second driving circuit part PC2 may be formed to be twice as large in the first direction DR1 as that of the first driving circuit part PC1. Thus, the area occupied by each of the second driving circuit parts PC2 may be doubled from the area occupied by each of the first driving circuit parts PC1. The area occupied by each second driving circuit part PC2 may be greater than the area occupied by each first driving circuit part PC1. For example, the area of the second driving circuit part PC2 may be in a range of about 1.1 times to about 2.0 times the area of the first driving circuit part PC1. In case that the area of the second driving circuit part PC2 is greater than the area of the first driving circuit part PC1, the area where each transistor and capacitor is formed may be large. Thus, a magnitude of the transistor (e.g., the width and the length of the channel) may also be large and a capacitance of the capacitor may also be formed to be large, even though the first driving circuit part PC1 and the second driving circuit part PC2 may have a same circuit structure and flat shape.

In FIG. 5, since the first light-emitting element ED1 and the second light-emitting element ED2 may display red (R), green (G), and blue (B), respectively, the reference numerals of the light-emitting elements having the colors are represented by r, g, and b added after reference numerals. In addition, r, g, and b are added after the reference numerals of the first driving circuit part PC1 and the second driving circuit part PC2 electrically connected to the corresponding light-emitting element to make the distinction clearer.

In FIG. 5, a wiring connecting (e.g., directly connecting) the driving circuit part and the light-emitting element is shown with (or represented by) a reference numeral CL (hereinafter, also referred to as an anode connection line or first connection line), and a wiring connecting between the light-emitting elements is shown with (or represented by) a reference numeral TL (hereinafter, also referred to as a copy anode connection line or second connection line). After the reference numerals of two connection lines, r, g, and b are added to distinguish the wirings (e.g., wiring CL, wiring TL, or the like) more clearly.

In the first display area DA1 of FIG. 5, the first driving circuit parts PC1 overlapping the first light-emitting element ED1 of each color in a plan view may be electrically connected to each other, and an anode connection line is not shown separately.

The connection structure of the second display area DA2 is described in detail with reference to FIGS. 5 and 6.

In FIG. 5, twelve (12) second driving circuit parts PC2 are illustrated, and forty-eight (48) second light-emitting elements ED2 are illustrated. The number of the second light-emitting elements ED2 may be four times the number of the second driving circuit parts PC2. For example, each second driving circuit part PC2 may supply a current to four second light-emitting elements ED2. One of the four second light-emitting elements ED2 may receive the current from (e.g., directly from) the second driving circuit part PC2, and remaining three of the four second light-emitting elements ED2 may divide and receive the received current, which are also referred to as copy second light-emitting elements. For example, the number of the copy second light-emitting elements may be three.

In FIG. 6, some regions of the second display area DA2 of FIG. 5 are enlarged and shown.

In FIG. 6, the second light-emitting elements may be divided into two types and reference numerals are provided. Some of the second light-emitting elements electrically connected (e.g., directly connected) to the anode connection lines CLr, CLb, CLg may be shown (or represented) by ED2*r*, ED2*b*, and ED2*g*. Another of the second light-emitting elements may be electrically connected to the copy anode connection lines TLr, TLb, TLg and are shown (or represented) by EDcr, EDcb, and EDcg.

The arrangement and the connection relationship of the red second light-emitting elements ED2*r* are described with reference to FIG. 6.

Four red second light-emitting elements ED2*r* may be electrically connected to each other by a red copy anode connection line TLr. One among the four red second light-emitting elements ED2*r* may be electrically connected from a red second driving circuit part PC2*r* to a red anode connection line CLr, thereby receiving a current. In FIG. 6, one of the four red second light-emitting elements ED2*r* and EDcr may receive (e.g., directly receive) the current from the red second driving circuit part PC2*r*, and is displayed (or represented) by a reference character R1. Remaining three red second light-emitting elements EDcr are marked with (or represented by) a reference character C, which corresponds to copy second light-emitting elements. According to an embodiment, the red anode connection line CLr and the red copy anode connection line TLr may be electrically connected to each other. Thus, the current may be distributed to the four red second light-emitting elements ED2*r*. A length of the red anode connection line CLr may be formed differently depending on a position of the four red second light-emitting elements ED2*r*. The red anode connection line CLr may extend to be electrically connected to the four red second light-emitting elements ED2*r* adjacent to the non-display area PA In an embodiment, the red anode connection line CLr may have a structure extending longest. The four red second light-emitting elements ED2*r* may be positioned in a first column of a first row, a third column of a third row, a fifth column of the first row, and a seventh column of the third row, respectively. The red copy anode connection line TLr may extend in the first direction DR1 between the first row and a second row, and may be additionally extended up and down in the second direction DR2 to be electrically connected to each red second light-emitting elements ED2*r* and EDcr.

Description of the blue second light-emitting element ED2*b* is provided below.

Four blue second light-emitting elements ED2*b* may be electrically connected to each other by a blue copy anode connection line TLb. One of the four blue second light-emitting elements ED2*b* may be electrically connected to a blue anode connection line CLb from a blue second driving circuit part PC2*b*, thereby receiving a current. In FIG. 6, one of the four blue second light-emitting elements ED2*b* and EDcb may receive (e.g., directly receive) the current from the blue second driving circuit part PC2*b*, and may be marked as (or represented by) a reference character B1. The remaining three blue second light-emitting elements EDcb may be marked with (or represented by) a reference character C, which corresponds to copy second light-emitting elements. According to an embodiment, the blue anode connection line CLb and the blue copy anode connection line TLb may be electrically connected to each other. Thus, the current may be distributed to the four blue second light-emitting elements ED2*b*. A length of the blue anode connection line CLb may be formed differently depending on a position of the four blue second light-emitting elements ED2*b*. The blue anode connection line CLb may extend to be electrically connected to the four blue second light-emitting elements ED2*b* adjacent to the non-display area PA In an embodiment, the blue anode connection line CLb may extend longest. The four blue second light-emitting elements ED2*b* may be respectively positioned in the first column of the third row, the third column of the first row, the fifth column of the third row, and the seventh column of the first row. The blue copy anode connection line TLb may extend to surround the four blue second light-emitting elements ED2*b* and may additionally extend up and down in the second direction DR2 to be electrically connected to each of the blue second light-emitting elements ED2*b* and EDcb.

Description of the green second light-emitting element ED2*g* is provided below.

Four green second light-emitting elements ED2*g* may be electrically connected to each other by a green copy anode connection line TLg. One of the four green second light-emitting elements ED2*g* may be electrically connected to a green anode connection line CLg from a green second driving circuit part PC2*g*, thereby receiving a current. In FIG. 6, one of the four green second light-emitting elements ED2*g* and EDcg may receive (e.g., directly receive) the current from the green second driving circuit part PC2*g*, and is marked as (or represented by) a reference character G1 or G2. The remaining three green second light-emitting elements EDcg may be marked with (or represented by) a reference character C, which corresponds to copy second light-emitting elements. According to an embodiment, the green anode connection line CLg and the green copy anode connection line TLg may be electrically connected to each other. Thus, the current may be distributed to the four green second light-emitting elements ED2*g*. A length of the green anode connection line CLg may be formed differently depending on a position of the four green second light-emitting elements ED2*g*. The green anode connection line CLg may extend to be electrically connected to the four green second light-emitting elements ED2*g* adjacent to the non-display area PA. In an embodiment, the green anode connection line CLg may have a structure that extends longest. The four green second light-emitting elements ED2*g* may be respectively positioned in a second column of the second row, the second column of a fourth row, a fourth column of the second row, and the fourth column of the fourth row. The green copy anode connection line TLg may be formed in a U shape and may electrically connect the four green second light-emitting elements ED2*g* and EDcg.

The number of the green second light-emitting elements ED2*g* may be twice the number of the red second light-emitting elements ED2*r* and the blue second light-emitting elements ED2*b*. The number of the green second driving circuit parts PC2*g* may also be twice that of the red second driving circuit parts PC2*r* and the blue second driving circuit parts PC2*b*. However, the number of the light-emitting elements ED2 and the driving circuit parts PC2 of each color may vary and may be formed to correspond to the number of the light-emitting elements ED1 and the driving circuit parts PC1 in the first display area DA.

The light-emitting elements ED1 and ED2 of each color may be arranged in a pentile matrix structure. The light-emitting elements ED1 and ED2 emitting a first color L1 and the light-emitting elements ED1 and ED2 emitting a third color L3 may be alternately arranged in the first direction DR1. The light-emitting elements ED1 and ED2 emitting the first color L1 and the light-emitting elements ED1 and ED2 emitting a second color L2 may be alternately arranged in a diagonal direction inclined with respect to the first direction DR1 and the second direction DR2. The light-emitting elements ED1 and ED2 emitting the first color L1 may be greater than the light-emitting elements ED1 and ED2 emitting the second color L2, and may be smaller than the light-emitting elements ED1 and ED2 emitting the third color L3. For example, the first color L1 may be red (R), the second color L2 may be green (G), and the third color L3 may be blue (B).

As shown in FIG. 5, the arrangement of the light-emitting elements ED1 and ED2 may be the same in the first display area DA1 and the second display area DA2 without a difference.

In FIG. 5, the light-emitting element ED1 and ED2 have a same magnitude (or size). In the embodiment of FIG. 5, the number of the light-emitting elements to which each driving circuit part supplies the current may be different in the first display area DA1 and the second display area DA2. For example, in the first display area DA1, each first driving circuit part PC1 may supply the current to a first light-emitting element ED1 (or to only one first light-emitting element ED1). However, in the second display area DA2, in the embodiment of FIG. 5, one second driving circuit part PC2 may supply the current to four second light-emitting elements ED2. Thus, the area occupied by the second driving circuit part PC2 may be greater than that of the first driving circuit part PC1, and the magnitudes (or sizes) of the transistor and the capacitor included in the second driving circuit part PC2 may also be greater than the magnitude of the transistor and the capacitor included in the first driving circuit part PC1.

However, according to the embodiment, the area occupied by the first light-emitting element ED1 and the area occupied by the second light-emitting element ED2 may be different. The area of the emission layer included in the second light-emitting element ED2 may be in a range of about 1.0 times to about 2.0 times the area of the emission layer included in the first light-emitting element ED1.

In FIG. 5, the third display area referring to DA1-2 of FIG. 12 (or DA2-2 of FIG. 15) may be positioned on the boundary part between the first display area DA1 and the second display area DA2. The third display area DA1-2, as shown in FIG. 12, may be positioned in the first display area DA1. In some embodiments, as shown in FIG. 15, the third display area DA2-2 may be positioned in the second display area DA2. According to an embodiment, a separate display area may exist between the first display area DA1 and the second display area DA2. Referring to FIG. 5, the first light-emitting element ED1 and the second light-emitting element ED2 displaying a same color may have a same magnitude in a plan view. In FIG. 5, although the third display area (e.g., DA1-2 of FIG. 12 or DA2-2 of FIG. 15) may be positioned in the first display area DA1 or the second display area DA2, which is not clearly shown, since all light-emitting elements displaying a same color have a same magnitude in FIG. 5, the first light-emitting elements ED1 positioned in the first display area DA1, the second light-emitting elements ED2 positioned in the second display area DA2, and the third light-emitting element positioned in the third display area may have a same magnitude in a plan view. Also, the third display area may display an intermediate luminance between the first display area DA1 and the second display area DA2.

Hereinafter, various structures of the second light-emitting element ED2 positioned in the second display area DA2 and their connection relationships are described with reference to FIGS. 7 to 9.

Figure 7:
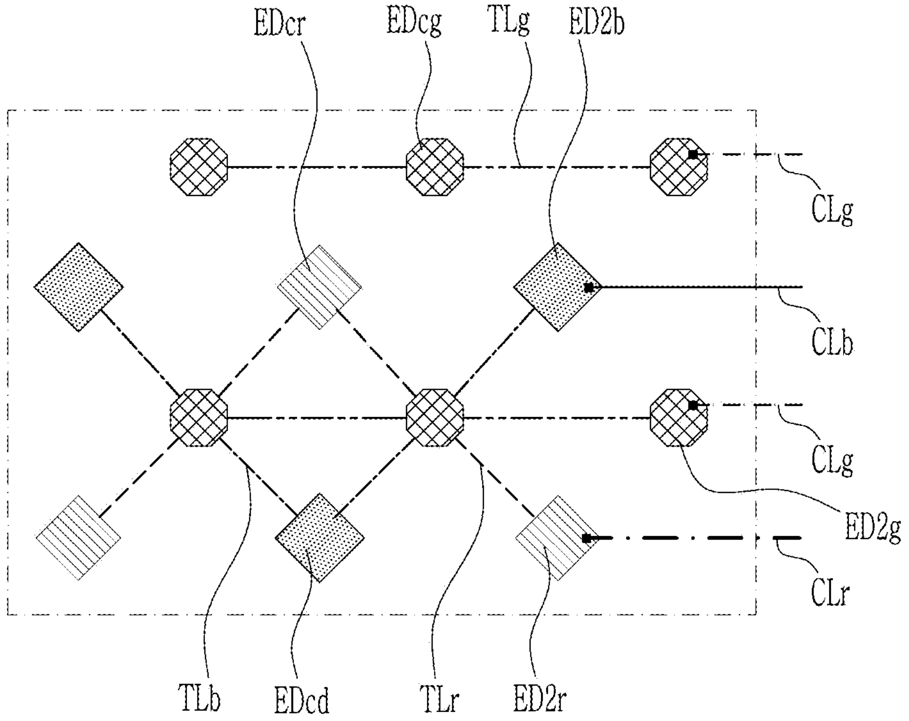
FIGS. 7 to 9 are schematic plan views showing a connection between a driving circuit part and a light-emitting element according to various embodiments.
Figure 8:
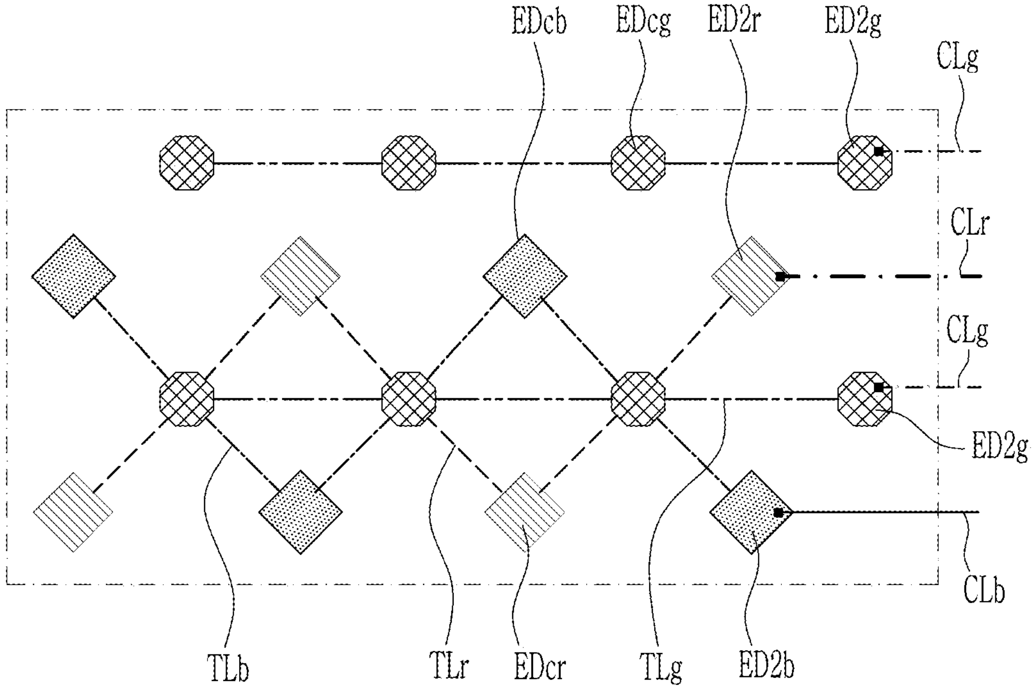
Figure 9:
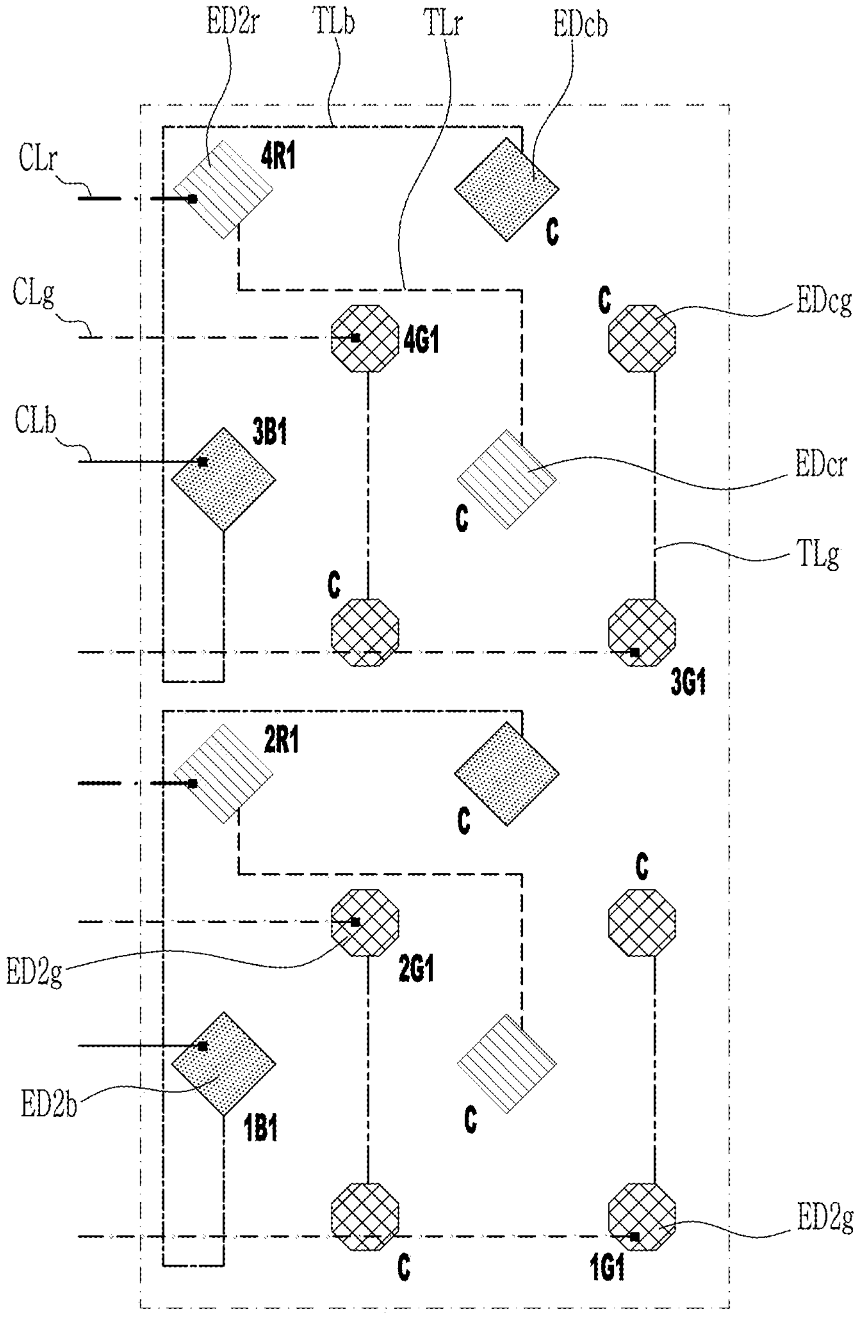

FIGS. 7 to 9 are schematic plan views showing a connection between a driving circuit part and a light-emitting element according to various embodiments.

In FIGS. 7 to 9, the second light-emitting elements may be divided into two types, and reference numerals are respectively provided thereto. Some of the second light-emitting elements electrically connected (e.g., directly connected) to the anode connection lines CLr, CLb, CLg are shown as ED2*r*, ED2*b*, ED2*g*, and the other second light-emitting elements may be electrically connected to the copy anode connection lines TLr, TLb, TLg and are shown as EDcr, EDcb, and EDcg.

In FIG. 7, three second light-emitting elements ED2 are electrically connected.

Three green second light-emitting elements ED2*g* and EDcg may be arranged in a line in a first row and a third row. Three red second light-emitting elements ED2*r* and EDcr and three blue second light-emitting elements ED2*b* and EDcb may be arranged alternately in a second row and a fourth row.

A green copy anode connection line TLg may be formed in the form of a straight line and may electrically connect the three green second light-emitting elements ED2*g* and EDcg. A red copy anode connection line TLr and a blue copy anode connection line TLb may extend in a diagonal direction to electrically connect the three red second light-emitting elements ED2*r* and EDcr and the three blue second light-emitting elements ED2*b* and EDcb, which are adjacent to each other, respectively.

The connection structure of FIG. 8 is different from the connection structure of FIG. 7 at least in that fourth second light-emitting elements ED2 are electrically connected. Unlike FIGS. 7 and 8, it may have a structure in which only two second light-emitting elements ED2 are electrically connected or five or more second light-emitting elements ED2 are electrically connected.

The connection structure of FIG. 9 is different from the connection structure of FIG. 6 at least in that only two second light-emitting elements ED2 are electrically connected.

Two green second light-emitting elements ED2*g* and EDcg may be arranged in a line in a second and fourth columns. Two red second light-emitting elements ED2*r* and EDcr and two blue second light-emitting elements ED2*b* and EDcb may be alternately arranged in a first row and a third row.

A green copy anode connection line TLg may be formed in a form of a straight line and may electrically connect two green second light-emitting elements ED2*g* and EDcg. A red copy anode connection line TLr may electrically connect two red second light-emitting elements ED2 and EDcr adjacent to each other through a bent structure. A blue copy anode connection line TLb may extend around two blue second light-emitting elements ED2*b* and EDcb and additionally extend up and down to be electrically connected to each of the blue second light-emitting elements ED2*b* and EDcb.

Hereinafter, the connection structure of the light-emitting element and the driving circuit part is described with reference to a cross-section diagram of FIG. 10.

Figure 10:
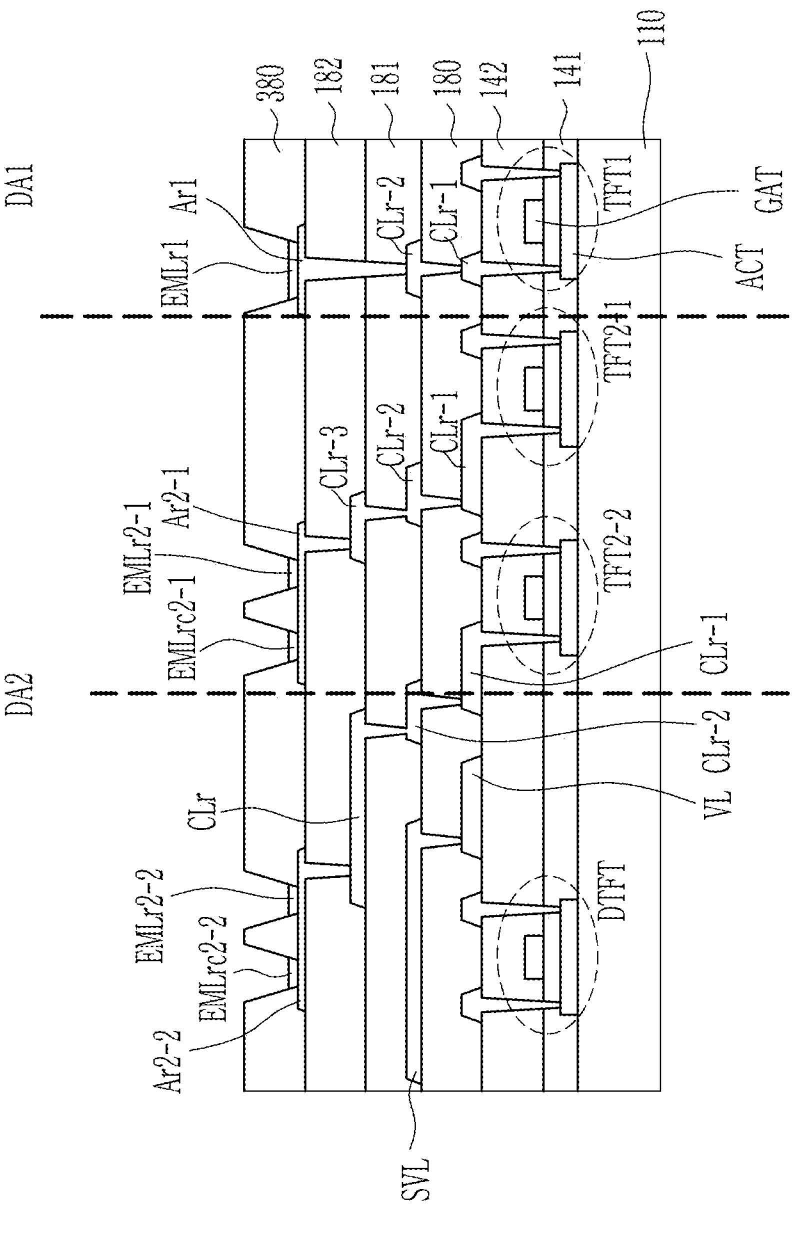
FIG. 10 is a schematic cross-sectional view showing a connection between a driving circuit part and an anode of a light-emitting element according to an embodiment.

FIG. 10 is a schematic cross-sectional view showing a connection of a driving circuit part and an anode of a light-emitting element according to an embodiment.

FIG. 10 schematically shows the cross-section of a first display area DA1 and a second display area DA2. The second display area DA2 may be divided into two regions (e.g., overlapping region and non-overlapping region) by a dotted line. Transistors TFT2-1 and TFT2-2 included in a second driving circuit part PC2 may be positioned in a region positioned to the right of the dotted line in the second display area DA2, and the overlapping region may be a region where a second light-emitting element ED2 and a second driving circuit part PC2 overlap each other in a plan view. In the second display area DA2 positioned to the left of the dotted line, the second driving circuit part PC2 may not be positioned, and a transistor DTFT included in a driving part such as a scan driver 20 may be positioned. The non-overlapping region may be a region where the second light-emitting element ED2 and the second driving circuit part PC2 do not overlap each other in a plan view.

In FIG. 10, a red light-emitting element, anodes Ar1, Ar2-1, and Ar2-2 belonging to the light-emitting element, and emission layers EMLr1, EMLr2-1, EMLr2-2, EMLrc2-1, and EMLr2-2 positioned thereon are shown.

Description of the cross-sectional structure of FIG. 10 is provided below.

A semiconductor layer ACT (hereafter referred to as a polycrystalline semiconductor layer) formed of a silicon semiconductor may be positioned on a substrate 110. The semiconductor layer ACT may include a channel, a first region, and a second region of transistors TFT1, TFT2-1, TFT2-2, and DTFT. A first gate insulating layer 141 may be positioned on the semiconductor layer ACT. The first gate insulating layer 141 may include at least one inorganic insulating material such as a silicon nitride ($SiN_x$), a silicon oxide ($SiO_x$), and a silicon oxynitride ($SiO_xN_y$).

A first gate conductive layer including a gate electrode GAT may be positioned on the first gate insulating layer 141. A second gate insulating layer 142 may be positioned on the first gate conductive layer including the gate electrode GAT and the first gate insulating layer 141. The second gate insulating layer 142 may include at least one inorganic insulating material such as a silicon nitride ($SiN_x$), a silicon oxide ($SiO_x$), and a silicon oxynitride ($SiO_xN_y$).

On the second gate insulating layer 142, a first data conductive layer that may be electrically connected to the first region or the second region of the semiconductor layer ACT may be positioned. FIG. 10 shows a first anode connection line CLr-1 and a voltage line VL as one of the first data conductive layers.

A first organic layer 180 may be positioned on the first data conductive layer. The first organic layer 180 may be formed of an organic material.

On the first organic layer 180, a second data conductive layer including a second anode connection line CLr-2 and a shielding pattern SVL may be positioned.

A second organic layer 181 and a third organic layer 182 may be positioned on the second data conductive layer. The second organic layer 181 and the third organic layer 182 may be formed of an organic material.

The anodes Ar1, Ar2-1, and Ar2-2 may be positioned on the third organic layer 182, and a barrier rib 380 having an opening exposing the anodes Ar1, Ar2-1, and Ar2-2 may be positioned thereon. Emission layers EMLr1, EMLr2-1, EMLr2-2, EMLrc2-1, and EMLr2-2 may be positioned on the barrier rib 380.

An opening may be formed in or through the second organic layer 181 and the third organic layer 182 in the first display area DA1, and the second anode connection line CLr-2 and the anode Ar1 may be electrically connected (e.g., directly connected) to each other through the opening. In the second display area DA2, the third anode connection line CLr-3 and the anode connection line CLr extending in a direction to the non-overlapping region in FIG. 5 may be additionally positioned.

Therefore, in the embodiment of FIG. 10, the first driving circuit part PC1 (e.g., refer to FIG. 4) of the first display area DA1 and the anode Ar1 of the first light-emitting element ED1 may be electrically connected to each other through the first anode connection line CLr-1 and the second anode connection line CLr-2.

In the embodiment of FIG. 10, the second driving circuit part PC2 (e.g., refer to FIG. 4) of the second display area DA2 and the anodes Ar2-1 and Ar2-2 of the second light-emitting element ED2 may be electrically connected to each other through the first anode connection line CLr-1, the second anode connection line CLr-2, and the third anode connection line CLr-3. In an embodiment, the second driving circuit part PC2 (e.g., refer to FIG. 4) of the second display area DA2 and the anodes Ar2-1 and Ar2-2 of the second light-emitting element ED2 may be electrically connected to each other through the first anode connection line CLr-1, the second anode connection line CLr-2, and the anode connection line CLr.

However, according to the embodiment, at least one of these anode connection lines may be removed or more may be added. These anode connection lines CLr, CLr-1, CLr-2, and CLr-3 may be formed of a transparent conductive material. In some embodiments, the anode connection lines CLr, CLr-1, CLr-2, and CLr-3 may be formed of an opaque conductive material such as a metal like the first gate conductive layer, the second gate conductive layer, the first data conductive layer, and the second data conductive layer, and electrical conductivity thereof may be secured.

A third display area referring to DA1-2 of FIG. 12 (or DA2-2 of FIG. 15) may be positioned on a boundary part between the first display area DA1 and the second display area DA2. The third display area DA1-2, as shown in FIG. 12, may be positioned in the first display area DA1. In some embodiments, as shown in FIG. 15, the third display area DA2-2 may be positioned in the second display area DA2. According to an embodiment, a separate display area may exist between the first display area DA1 and the second display area DA2.

Description of the third display area positioned on such a boundary part is provided below.

Figure 11A:
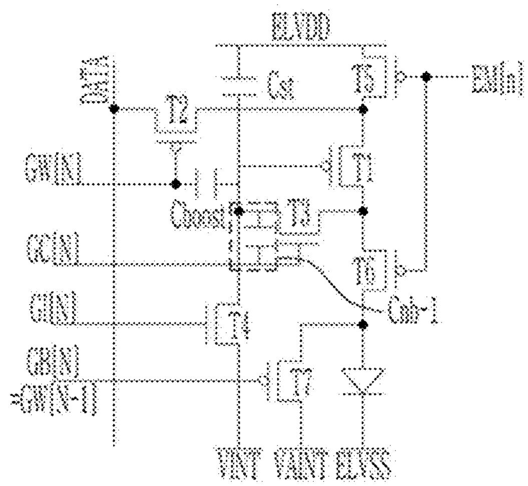
FIGS. 11A to 11C are schematic diagrams of equivalent circuits of different pixels included in a display panel according to an embodiment.
Figure 11B:
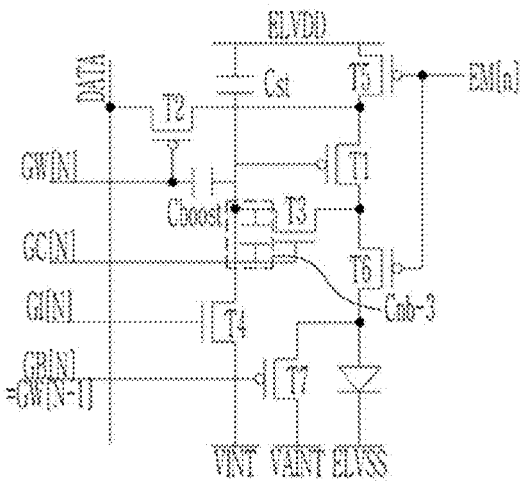
Figure 11C:
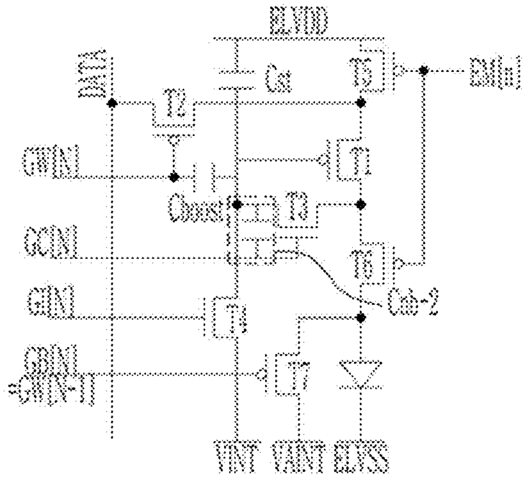

A circuit structure of a pixel positioned in the third display area positioned on the boundary part may be described together in addition to the pixel structure included in the first display area DA1 and the second display area DA2 according to an embodiment with reference to FIGS. 11A to 11C.

FIGS. 11A to 11C are schematic diagrams of equivalent circuits of different pixels included in a display panel according to an embodiment.

FIG. 11A is a schematic diagram of an equivalent circuit of a pixel formed in the first display area DA1 (e.g., refer to FIG. 10). The pixel of FIG. 11A is referred to as a first pixel. FIG. 11C is a schematic diagram of an equivalent circuit of a pixel formed in the second display area DA2 (e.g., refer to FIG. 10). The pixel of FIG. 11C is referred to as a second pixel. FIG. 11B is a schematic diagram of an equivalent circuit of a pixel formed in at least a partial region of the third display area positioned at the boundary part. The pixel of FIG. 11B is referred to as an intermediate pixel or a third pixel. In an embodiment, the third pixel in FIG. 11B may not be formed in the entire third display area, and the first pixel or second pixel may be positioned in the third display area where the third pixel is not positioned. As shown in FIG. 12, in case that the third display area is positioned within the first display area DA1, the first pixel may be positioned in the third display area where the third pixel is not positioned. In some embodiments, as shown in FIG. 15, in case that the third display area is positioned in the second display area DA2, the second pixel may be positioned in the third display area where the third pixel is not positioned. The third display area may display an intermediate luminance between the first display area DA1 and the second display area DA2.

As shown in FIGS. 11A to 11C, circuit structures of the first pixel, the second pixel, and the third pixel may be identical to each other. Capacitance magnitudes of boost capacitors Cnb-1, Cnb-2, and Cnb-3 may be different from one another. At least one of driving transistors T1 included in the three pixel circuits may have different magnitudes from other driving transistors T1.

Since the pixel circuits of FIGS. 11A to 11C have a same circuit structure, description of the overall pixel circuit structure is provided below.

Each pixel according to an embodiment may include transistors T1, T2, T3, T4, T5, T6, and T7, a storage capacitor Cst, an additional boost capacitor Cboost, a light-emitting element, and boost capacitors Cnb-1, Cnb-2, and Cnb-3, which are electrically connected to several wires. The light-emitting element may be a light-emitting diode, and transistors and capacitors may constitute a driving circuit part. According to the embodiment, the additional boost capacitor Cboost may be omitted.

Wires may be electrically connected to a pixel P (e.g., refer to FIG. 3). The wires may include a first initialization voltage line to which a first initialization voltage VINT is applied, a second initialization voltage line to which a second initialization voltage VAINT is applied, a first scan line to which a first scan signal GW[N] is applied, a second scan line to which a second scan signal GC[N] is applied, an initialization control line to which an initialization signal GI[N] is applied, a light emission control line to which a light emission control signal EM[n] is applied, a data line to which a data voltage DATA is applied, a driving voltage line to which a driving voltage ELVDD is applied, and a common voltage line to which a driving low voltage ELVSS is applied. In an embodiment, the scan line electrically connected to the seventh transistor T7 and the first scan line electrically connected to the second transistor T2 may receive a same signal (e.g., first scan signal GW[N]). In an embodiment of FIGS. 11A to 11C, the seventh transistor T7 may receive a separate bypass control signal GB[N] (or previous first scan signal GW[N−1]) unlike the second transistor T2.

The first scan line may be electrically connected to a scan driver 20 (e.g., refer to FIG. 4) and transmit the first scan signal GW[N] (or GW[N−1]) to the second transistor T2 and the seventh transistor T7. For example, the first scan signal GW[N] may be applied to the second transistor T2, and the previous first scan signal GW[N−1] (or separate bypass control signal GB[N]) may be applied to the seventh transistor T7. The second scan signal GC[N] applied to the second scan line may be applied with a voltage of an opposite polarity to a voltage (e.g., first scan signal GW[N]) applied to the first scan line at the same time as the signal of the first scan line. For example, in case that a negative voltage is applied to the first scan line, a positive voltage may be applied to the second scan line. The second scan line may transmit the second scan signal GC[N] to the third transistor T3. The initialization control line may transmit the initialization control signal GI[N] to the fourth transistor T4. The light emission control line may transmit the light emission control signal EM[n] to the fifth transistor T5 and the sixth transistor T6.

The data line may be a wire that transmits the data voltage DATA generated by a data driver 58 (e.g., refer to FIG. 3). Accordingly, a magnitude of a light emission current transmitted to the light-emitting element may be changed, and luminance of the light-emitting element may be changed. The driving voltage line may apply the driving voltage ELVDD. The first initialization voltage line may transmit the first initialization voltage VINT, and the second initialization voltage line may transmit the second initialization voltage VAINT. The common voltage line may apply the driving low voltage ELVSS to a cathode of the light-emitting element. In the embodiment, each of the voltages applied to the driving voltage line, the first and second initialization voltage lines, and the common voltage line may be a constant voltage.

The driving transistor T1 (or first transistor) may be a p-type transistor, and have a silicon semiconductor or a polycrystalline semiconductor as a semiconductor layer. The driving transistor T1 may be a transistor that adjusts a magnitude of the light emission current output to an anode of the light-emitting element according to a magnitude of the voltage of the gate electrode of the driving transistor T1 (e.g., voltage stored in storage capacitor Cst). Since a brightness of the light-emitting element is adjusted according to the magnitude of the light emission current output to the anode of the light-emitting element, a light emission luminance of the light-emitting element may be adjusted according to the data voltage DATA applied to the pixel. Thus, a first electrode of the driving transistor T1 may be disposed to receive the driving voltage ELVDD, and may be electrically connected to the driving voltage line via the fifth transistor T5. The first electrode of the driving transistor T1 may also be electrically connected to a second electrode of the second transistor T2 to receive the data voltage DATA. The second electrode of the driving transistor T1 may output the light emission current to the light-emitting element and may be electrically connected to the anode of the light-emitting element via the sixth transistor T6. The sixth transistor T6 may be referred to as an output control transistor. The second electrode of the driving transistor T1 may also be electrically connected to the third transistor T3, and the data voltage DATA applied to the first electrode of the driving transistor T1 may be transferred to the third transistor T3. The gate electrode of the driving transistor T1 is electrically connected to an electrode (hereinafter, referred to as 'a second storage electrode') of the storage capacitor Cst. Accordingly, the voltage of the gate electrode of the driving transistor T1 changes depending on the voltage stored in the storage capacitor Cst, and accordingly, the light emission current output by the driving transistor T1 is changed. The storage capacitor Cst serves to maintain the voltage of the gate electrode of the driving transistor T1 constant for a frame. The gate electrode of the driving transistor T1 may also be electrically connected to the third transistor T3, and the data voltage DATA applied to the first electrode of the driving transistor T1 may be transmitted to the gate electrode of the driving transistor T1 through the third transistor T3. The gate electrode of the driving transistor T1 may also be electrically connected to the fourth transistor T4 and may receive the first initialization voltage VINT to be initialized.

The gate electrode of the driving transistor T1 may also be electrically connected to an end of the additional boost capacitor Cboost, and may be additionally and electrically connected to ends of the boost capacitors Cnb-1, Cnb-2, and Cnb-3. The additional boost capacitor Cboost and the boost capacitors Cnb-1, Cnb-2, and Cnb-3 may also serve to change the voltage of the gate electrode of the driving transistor T1 in a same direction in case that the first scan signal GW[N] and the second scan signal GC[N] change. However, since voltages of the first scan signal GW[N] and the second scan signal GC[N] may change in opposite directions at a same timing, two additional boost capacitors Cboost and the boost capacitors Cnb-1, Cnb-2, and Cnb-3 may be compensated by each other so that the voltage of the gate electrode of the driving transistor T1 may not change significantly. In the embodiment, the first boost capacitor Cnb-1 included in the first pixel, the second boost capacitor Cnb-2 included in the second pixel, and the third boost capacitor Cnb-3 included in the third pixel may have different capacitance values from one another, and voltage fluctuation width (or voltage fluctuation range) of the gate electrode of the driving transistor T1 in each pixel may also be different from each other. For example, the voltage fluctuation range of the driving transistor (also called a first driving transistor) of the first pixel electrically connected to the first boost capacitor Cnb-1, the voltage fluctuation range of the driving transistor (also called a second driving transistor) of the second pixel electrically connected to the second boost capacitor Cnb-2, and the voltage fluctuation range of the driving transistor (also called a third driving transistor) electrically connected to the third boost capacitor Cnb-3, may be different from each other.

In case that a low voltage is applied to the second scan signal GC[N], the third transistor T3 may be changed from a turn-on state to a turn-off state. Thus, the boost capacitors Cnb-1, Cnb-2, and Cnb-3 may lower (or decrease) the voltage of the gate electrode of the driving transistor T1. Accordingly, the capacitance of the boost capacitors Cnb-1, Cnb-2, and Cnb-3 may be increased as the output current of the driving transistor T1, which is transmitted to the light-emitting element, increases. As a result, the luminance of the light-emitting element may be increased. The display luminance may be adjusted through a third device (e.g., third pixel) in the intermediate region, and the boundary part of the first display area DA1 and the second display area DA2 may be prevented from being recognized. The capacitance magnitude of the third boost capacitor Cnb-3 included in the third pixel may be greater than the capacitance magnitude of at least one of the first boost capacitor Cnb-1 and the second boost capacitor Cnb-2. As shown in FIG. 12, in case that the third display area is positioned within the first display area DA1, the capacitance magnitude of the third boost capacitor Cnb-3 may be greater than the capacitance magnitude of the first boost capacitor Cnb-1. In some embodiments, as shown in FIG. 15, in case that the third display area is positioned in the second display area DA2, the capacitance magnitude of the third boost capacitor Cnb-3 may be greater than that of the second boost capacitor Cnb-2.

The second transistor T2 may be a p-type transistor and have a silicon semiconductor or polycrystalline semiconductor as a semiconductor layer. The second transistor T2 may be a transistor that receives (or transmits) the data voltage DATA into the pixel. A gate electrode of the second transistor T2 may be electrically connected to the first scan line 151 and another electrode of the additional boost capacitor Cboost (hereinafter, referred to as 'a lower boost electrode'). The first electrode of the second transistor T2 is electrically connected to the data line 171 (e.g., refer to FIG. 17). The second electrode of the second transistor T2 is electrically connected to the first electrode of the driving transistor T1. In case that the second transistor T2 is turned on by a negative voltage among the first scan signals GW[N] transmitted through the first scan line 151 (e.g., refer to FIG. 17), the data voltage DATA transmitted through the data line 171 may be transmitted to the first electrode of the driving transistor T1. Thus, the data voltage DATA may be transferred to the gate electrode of the driving transistor T1 and stored in the storage capacitor Cst.

The third transistor T3 may be an n-type transistor and have an oxide semiconductor as a semiconductor layer. The third transistor T3 may electrically connect the second electrode of the driving transistor T1 and the gate electrode of the driving transistor T1. As a result, the third transistor T3 may be a transistor that allows the data voltage DATA to be compensated by a threshold voltage of the driving transistor T1 and stored in the second storage electrode of the storage capacitor Cst. A gate electrode of the third transistor T3 may be electrically connected to a second scan line 152 (e.g., refer to FIG. 17), and a first electrode of the third transistor T3 may be electrically connected to the second electrode of the driving transistor T1. A second electrode of the third transistor T3 may be electrically connected to the second storage electrode of the storage capacitor Cst, the gate electrode of the driving transistor T1, and an electrode of the additional boost capacitor Cboost (hereinafter referred to as the upper boost electrode). The third transistor T3 may be turned on by a positive voltage of the second scan signal GC[N] received through the second scan line 152 (e.g., refer to FIG. 17). Thus, the gate electrode of the driving transistor T1 and the second electrode of the driving transistor T1 may be electrically connected to each other, and the voltage applied to the gate electrode of the driving transistor T1 may be transferred to the second storage electrode of the storage capacitor Cst and stored in the storage capacitor Cst. The voltage stored in the storage capacitor Cst may be the voltage of the gate electrode of the driving transistor T1 in case that the driving transistor T1 is turned off. Thus, the threshold voltage Vth of the driving transistor T1 may be stored in a compensated state.

The boost capacitors Cnb-1, Cnb-2, and Cnb-3 may be positioned between the gate electrode of the third transistor T3 and the second electrode of the third transistor T3. A terminal (referred to as the lower additional boost electrode) may be electrically connected to the second scan line to which the second scan signal GC[N] is applied, and another terminal (referred to as the upper additional boost electrode) may be electrically connected to the second electrode of the third transistor T3. The another terminal of the boost capacitors Cnb-1, Cnb-2, and Cnb-3 may be additionally and electrically connected to the gate electrode of the driving transistor T1, an electrode (e.g., the second storage electrode) of the storage capacitor Cst, an electrode (e.g., the upper boost electrode) of the additional boost capacitor Cboost, and a second electrode of the fourth transistor T4.

In case that the low voltage is applied to the second scan signal GC[N], the second scan signal GC[N] may change the third transistor T3 from the turn-on state to the turn-off state. Thus, the boost capacitors Cnb-1, Cnb-2, and Cnb-3 may lower (or decrease) the voltage of the gate electrode of the driving transistor T1. Accordingly, the capacitance of the boost capacitors Cnb-1, Cnb-2, and Cnb-3 may be increased as the output current of the driving transistor T1, which is transmitted to the light-emitting element, increases. As a result, the luminance of the light-emitting element may be increased.

The fourth transistor T4 may be an n-type transistor and have an oxide semiconductor as a semiconductor layer. The fourth transistor T4 may serve to initialize the gate electrode of the driving transistor T1 and the second storage electrode of the storage capacitor Cst. A gate electrode of the fourth transistor T4 may be electrically connected to an initialization control line 153 (e.g., refer to FIG. 17), and a first electrode of the fourth transistor T4 may be electrically connected to a first initialization voltage line 127 (e.g., refer to FIG. 17). A second electrode of the fourth transistor T4 may be electrically connected to the second electrode of the third transistor T3, the second storage electrode of the storage capacitor Cst, the gate electrode of the driving transistor T1, and the upper boost electrode of the additional boost capacitor Cboost. The fourth transistor T4 may be turned on by the positive voltage of the initialization control signal GI[N] received through the initialization control line 153 (e.g., refer to FIG. 17), and the first initialization voltage VINT may be transmitted to the gate electrode of the driving transistor T1, the second storage electrode of the storage capacitor Cst, and the upper boost electrode of the additional boost capacitor Cboost to initialize the above-described elements (e.g., driving transistor T1, storage capacitor Cst, additional boost capacitor Cboost, or the like).

Each of the fifth transistor T5 and the sixth transistor T6 may be a p-type transistor, and have a silicon semiconductor or a polycrystalline semiconductor as a semiconductor layer.

The fifth transistor T5 may serve to transmit the driving voltage ELVDD to the driving transistor T1. A gate electrode of the fifth transistor T5 may be electrically connected to a light emission control line 155 (e.g., refer to FIG. 17). A first electrode of the fifth transistor T5 may be electrically connected to the driving voltage line 172. A second electrode of the fifth transistor T5 may be electrically connected to the first electrode of the driving transistor T1.

The sixth transistor T6 may serve to transmit the light emission current output from the driving transistor T1 to the light-emitting element. A gate electrode of the sixth transistor T6 may be electrically connected to the light emission control line 155 (e.g., refer to FIG. 17). A first electrode of the sixth transistor T6 may be electrically connected to the second electrode of the driving transistor T1. A second electrode of the sixth transistor T6 may be electrically connected to the anode of the light-emitting element.

The seventh transistor T7 may be a p-type transistor and have a silicon semiconductor (e.g., a polycrystalline semiconductor) or an oxide semiconductor as a semiconductor layer. The seventh transistor T7 may serve to initialize the anode of the light-emitting element. A gate electrode of the seventh transistor T7 may be electrically connected to the first scan line 151. A first electrode of the seventh transistor T7 may be electrically connected to the anode of the light-emitting element. A second electrode of the seventh transistor T7 may be electrically connected to the second initialization voltage line 128. In case that the seventh transistor T7 is turned on by a negative voltage of the first scan line 151 (e.g., refer to FIG. 17), the second initialization voltage VAINT may be applied to the anode of the light-emitting element to be initialized. The gate electrode of the seventh transistor T7 may be electrically connected to a separate bypass control line and may be controlled by the separate wiring (e.g., separate bypass control line) regardless of the first scan line 151. According to an embodiment, the second initialization voltage line 128 to which the second initialization voltage VAINT is applied and the first initialization voltage line 127 to which the first initialization voltage VINT is applied may be the same as each other.

Each pixel PX may include seven transistors T1 to T7, three capacitor storage capacitors Cst, the additional boost capacitor Cboost, and boost capacitors Cnb-1, Cnb-2, and Cnb-3, but the disclosure is not limited thereto. In some embodiments, the additional boost capacitor Cboost may be omitted. Although the third transistor T3 and the fourth transistor T4 are formed of an n-type transistor as an embodiment, only one of the third transistor T3 and the fourth transistor T4 may be formed of an n-type transistor or another of the third transistor T3 and the fourth transistor T4 may be formed of an n-type transistor.

The overall circuit structure of the first pixel formed in the first display area DA1, the second pixel formed in the second display area DA2, and the third pixel of the third display area positioned at the boundary part has been described.

The third display area positioned on the boundary part may be positioned within the first display area DA1 or within the second display area DA2, and the third display area may be confirmed and determined with reference to a following table.

TABLE 1

| First display area luminance | Second display area luminance | Third display area position |
|---|---|---|
| Low | High | Position within first display area |
| High | Low | Position within second display area |

Table 1 may be interpreted as follows.

Referring to Table 1, since the luminance of the first display area DA1 and the second display area DA2 may be different from each other, a gray in which the boundary part is readily recognized by a user may be displayed in the first display area DA1 and the second display area DA2, respectively. The luminance of the two regions may be compared. In case that the luminance of the first display area DA1 is displayed low and the luminance of the second display area DA2 is displayed high and the boundary part is visually recognized, the third display area may be formed within the first display area DA1 and be disposed to be in contact with the second display area DA2. Conversely, in case that the luminance of the second display area DA2 is displayed low and the luminance of the first display area DA1 is displayed high and the boundary part is visually recognized, the third display area may be formed within the second display area DA2 and may be disposed to be in contact with the first display area DA1. The third display area may display the intermediate luminance between the first display area DA1 and the second display area DA2.

Figure 16A:
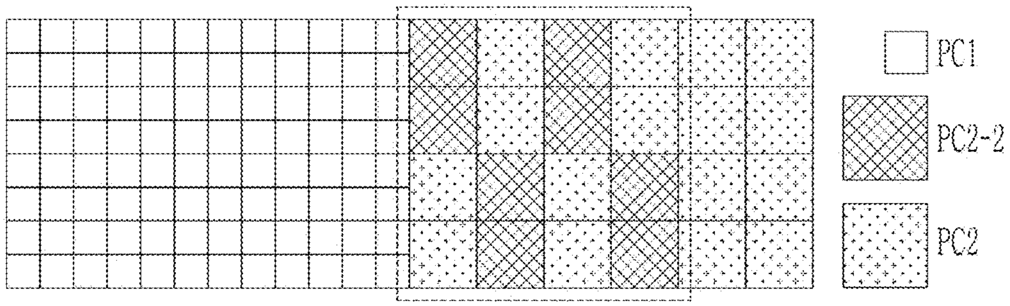
FIGS. 16A to 16C are schematic views showing a pixel arrangement of a display panel according to various embodiments.
Figure 16B:
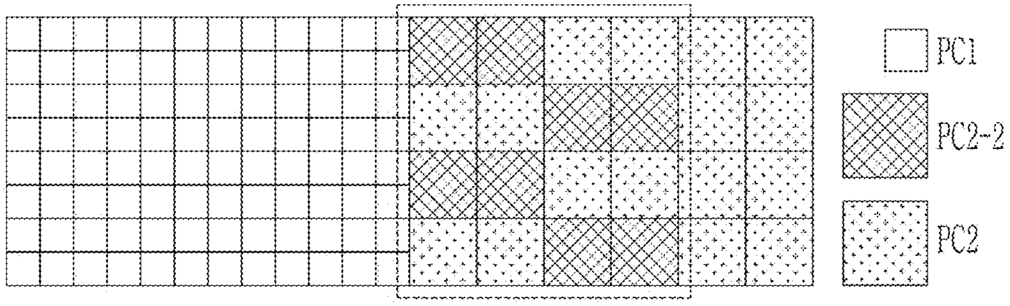
Figure 16C:
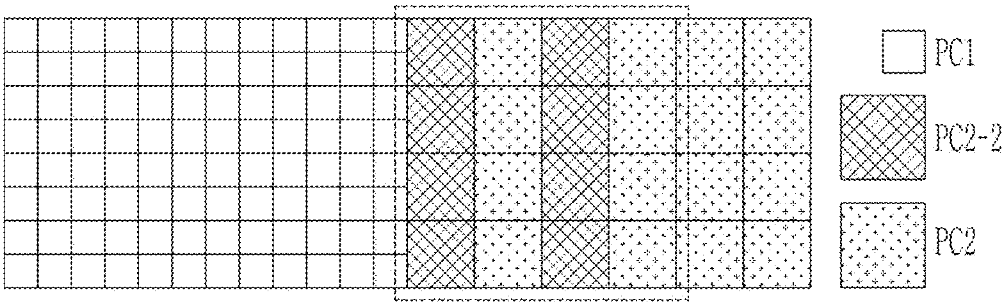

Hereinafter, FIGS. 12 to 14B show an embodiment in which the third display area is formed within the first display area DA1, and FIGS. 15 to 16C show an embodiment in which the third display area is formed within the second display area DA2.

The embodiment in which the third display area is formed within the first display area DA1 is described with reference to FIGS. 12 to 14B. In FIGS. 12 to 14B, since a luminance of the first display area DA1 is lower than a luminance of the second display area DA2, a boundary part between the first display area DA1 and the second display area DA2 is not visually recognized by the user by increasing a luminance of the boundary part of the first display area DA1 through the third display area.

FIG. 12 is a schematic view showing a pixel arrangement of a display panel according to an embodiment.

Each quadrangle shown in FIG. 12 means a driving circuit part PC. Quadrangles of FIG. 12 may include three driving circuit parts PC1, PC1-2, and PC2.

In FIG. 12, a first display area DA1 may include a third display area DA1-2 disposed on a part of the first display area DA1 in contact with the second display area DA2. First pixels may be formed in a remaining part of the first display area DA1, which is referred to as a normal first display area DA1-1. In the third display area DA1-2, driving circuit parts PC1 and PC1-2 respectively corresponding to first pixels and third pixels may be alternately formed. The first driving circuit part PC1 included in each of the first pixels and the third driving circuit part PC1-2 included in each of the third pixels may be equally formed except for a magnitude (e.g., capacity) of a boost capacitor. For example, a magnitude (e.g., capacity) of a capacitance of a third boost capacitor Cnb-3 (e.g., refer to FIG. 11B) of the third driving circuit part PC1-2 may be formed to be greater than a magnitude (e.g., capacity) of a capacitance of the first boost capacitor Cnb-1 (e.g., refer to FIG. 11A) of the first driving circuit part PC1. An additional overlapping area may be more formed in the third boost capacitor Cnb-3 of the third driving circuit part PC1-2 than in the first boost capacitor Cnb-1 of the first driving circuit part PC1. For example, the additional overlapping area may be formed in the third boost capacitor Cnb-3 of the third driving circuit part PC1-2, and may not be formed in the first boost capacitor Cnb-1 of the first driving circuit part PC1.

Comparing the first driving circuit part PC1 of the first pixel of the first display area DA1 and the second driving circuit part PC2 of the second pixel of the second display area DA2, an area of the second driving circuit part PC2 may be four times an area of the first driving circuit part PC1. As a result, a magnitude (e.g., size) of a driving transistor T1 (e.g., refer to FIG. 11A) of the first driving circuit part PC1 may be greater than a magnitude (e.g., size) of a driving transistor T1 of the second driving circuit part PC2 by four times. A capacitance of a capacitor (e.g., first boost capacitor Cnb-1 of FIG. 11A) of the first driving circuit part PC1 may be greater than a capacitance of a capacitor (e.g., second boost capacitor Cnb-2 of FIG. 11C) of the second driving circuit part PC2 by about four times.

Therefore, the magnitude (e.g., the length and/or width of the channel) of the driving transistor T1 (e.g., refer to FIG. 11B) of the second driving circuit part PC2 may be formed to be greater than twice that of the first driving circuit part PC1 and the third driving circuit part PC1-2. The driving transistor T1 (e.g., refer to FIG. 11A) of the first driving circuit part PC1 and the driving transistor T1 (e.g., refer to FIG. 11C) of the third driving circuit part PC1-2 may have substantially a same magnitude (e.g., length and/or width of channel).

The capacitance magnitude (e.g., capacity) of the second boost capacitor Cnb-2 (e.g., refer to FIG. 11C) of the second driving circuit part PC2 may be formed to be greater than twice that of the first driving circuit part PC1 and the third driving circuit part PC1-2. The capacitance magnitude (e.g., capacity) of a third boost capacitor Cnb-3 (e.g., refer to FIG. 11B) of the third driving circuit part PC1-2 may be formed to be greater than the capacitance magnitude (e.g., capacity) of the first boost capacitor Cnb-1 (e.g., refer to FIG. 11A) of the first driving circuit part PC1.

In the above structure, for a same data voltage DATA (e.g., refer to FIG. 11B), the second driving circuit part PC2 may generate the largest current to be transmitted to second light-emitting elements ED2 (e.g., refer to FIG. 5), and the second light-emitting elements ED2 may divide and receive the current to display the desired luminance. The luminance displayed by the second light-emitting element ED2 may be brighter than the luminance displayed by the first light-emitting element ED1 (e.g., refer to FIG. 5) of the normal first display area DA1-1. For a same data voltage DATA, the third driving circuit part PC1-2 may generate the larger current than the first driving circuit part PC1. Thus, the light-emitting element electrically connected to the third driving circuit part PC1-2 may exhibit (or display) an image of a brighter luminance. The third display area DA1-2 of FIG. 12 may include the third driving circuit part PC1-2 to display an image of a relatively bright luminance with respect to the same data voltage DATA. Thus, the luminance difference between the normal first display area DA1-1 and the second display area DA2 may be reduced, thereby preventing the boundary part from being recognized by the user. The third driving circuit part PC1-2 may include the third boost capacitor Cnb-3 that is greater than the first driving circuit part PC1. Thus, the third boost capacitor Cnb-3 may lower (or decrease) the voltage of the gate electrode of the driving transistor T1 and the output current of the driving transistor T1 may be increased.

In FIG. 12, the driving circuit parts PC1 and PC1-2 respectively corresponding to the first pixel and the third pixel may be alternately formed in the third display area DA1-2.

However, the luminance of the first display area DA1 may be lower than the luminance of the second display area DA2. However, the third display area is not limited to the embodiment shown in FIG. 12. The third display area positioned within the first display area DA1 may be formed by various embodiments as in FIGS. 13A to 13I.

FIG. 12 is a schematic view showing a pixel arrangement of a display panel according to an embodiment.

In FIGS. 13A to 13I, a part displayed by a dotted line corresponds to the third display area DA1-2 of FIG. 12.

Figure 13A:
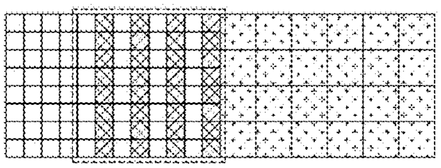
FIGS. 13A to 13I are schematic views showing a pixel arrangement of a display panel according to various embodiments.
Figure 13B:
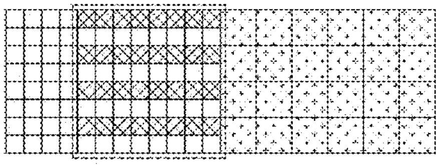
Figure 13C:
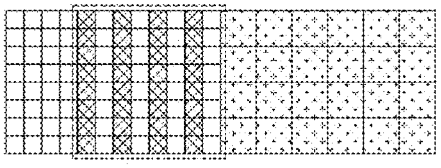
Figure 13C:
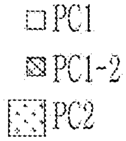

In FIG. 13A, first driving circuit parts PC1 and third driving circuit parts PC1-2 may be alternately disposed in a column in a third display area DA1-2 (e.g., refer to FIG. 12). In FIG. 13B, first driving circuit parts PC1 and third driving circuit parts PC1-2 may be alternately disposed in a row in a third display area DA1-2. In FIG. 13C, first driving circuit parts PC1 and third driving circuit parts PC1-2 may be alternately disposed in a column in a third display area DA1-2. However, the columns in contact with a second display area DA2 (e.g., refer to FIG. 12) may be different from each other.

Figure 13D:
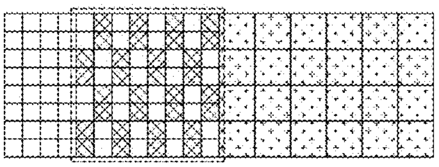
Figure 13E:
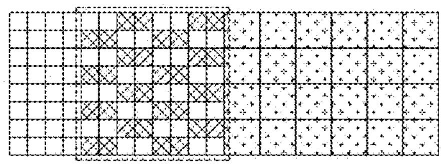
Figure 13F:
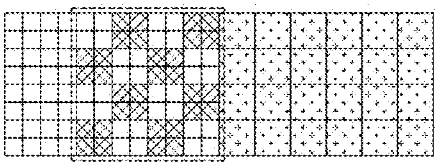
Figure 13F:
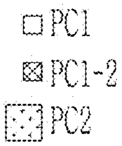
Figure 13G:
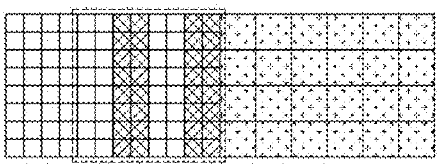
Figure 13H:
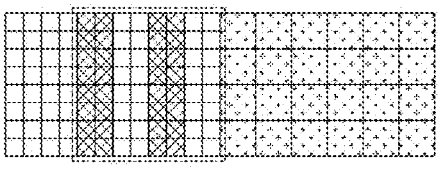
Figure 13I:
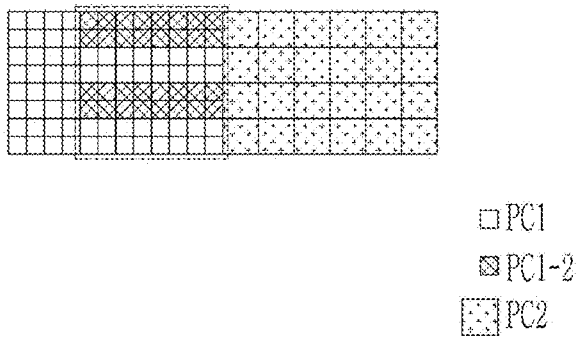

In FIG. 13D, first driving circuit parts PC1 and third driving circuit parts PC1-2 may be arranged in a 2×1 matrix form and alternately and repeatedly formed in each driving circuit part in a third display area DA1-2 (e.g., refer to FIG. 12). In FIG. 13E, first driving circuit parts PC1 and third driving circuit parts PC1-2 may be arranged in a 1×2 matrix form and alternately and repeatedly formed in each driving circuit part in a third display area DA1-2. In FIG. 13F, first driving circuit parts PC1 and third driving circuit parts PC1-2 may be arranged in a 2×2 matrix form and alternately and repeatedly formed in each driving circuit part in a third driving circuit part PC1-2. In FIG. 13G, first driving circuit parts PC1 and third driving circuit parts PC1-2 may be alternately disposed by two columns in a third display area DA1-2. In FIG. 13H, first driving circuit parts PC1 and third driving circuit parts PC1-2 may be alternately disposed by two columns in a third display area DA1-2, but the columns in contact with a second display area DA2 (e.g., refer to FIG. 12) may be different from the columns of FIG. 13G. In FIG. 13I, first driving circuit parts PC1 and third driving circuit parts PC1-2 may be alternately disposed by two rows in a third display area DA1-2.

Although various embodiments are illustrated in FIGS. 13A to 13I, the disclosure is not limited thereto. The first driving circuit part PC1 and the third driving circuit part PC1-2 may be arranged in the third display area DA1-2 in various other ways.

Hereinafter, the effect according to the embodiment of FIG. 12 is described with reference to FIGS. 14A and 14B.

Figure 14A:
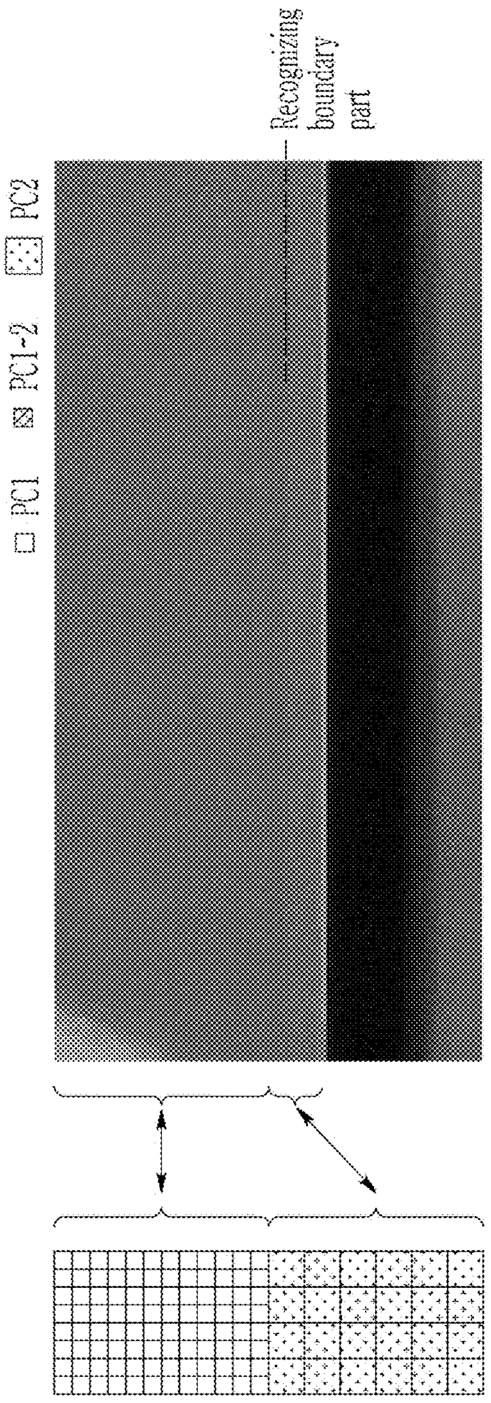
FIGS. 14A and 14B are schematic views taken around a boundary part in a display panel according to a comparative example and an embodiment of FIG. 12.
Figure 14B:
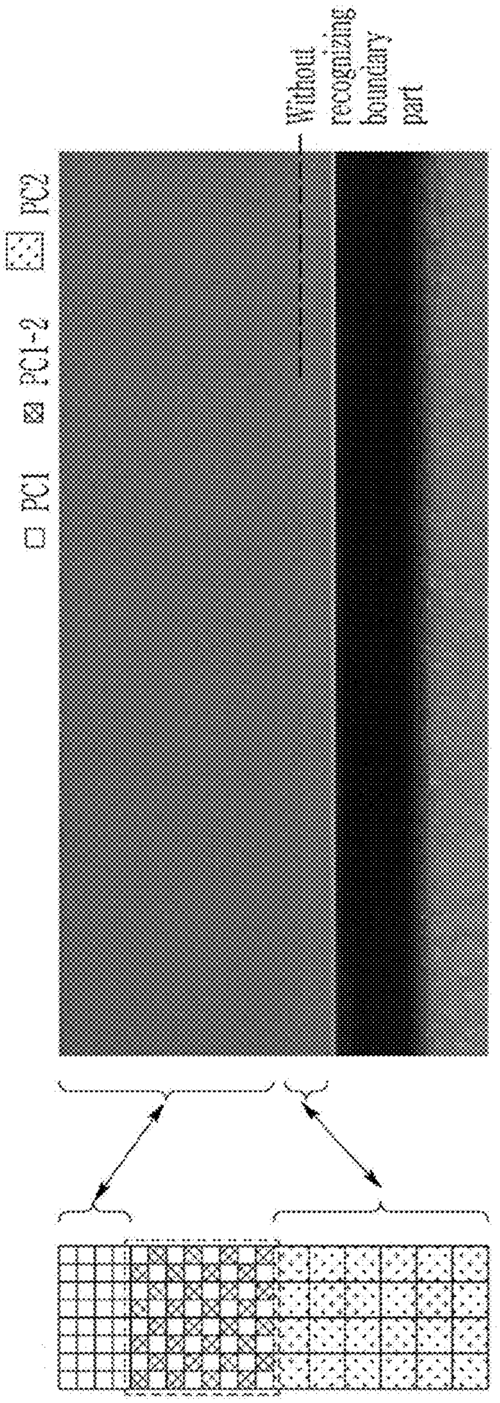

FIGS. 14A and 14B are schematic views taken around a boundary part in a display panel according to a comparative example and an embodiment of FIG. 12.

FIG. 14A is a schematic view taken around a boundary part in a display panel according to a comparative example. Referring to FIG. 14A, a first display area and a second display area may be in direct contact with each other to form a boundary, and a third display area may not be included on the boundary part. Thus, the boundary part may be visually recognized due to the difference in luminance in a photo (or image) on the right.

In contrast, FIG. 14B is a schematic view taken around a boundary part in a display panel according to the embodiment of FIG. 12. Referring to FIG. 14B, a third display area DA1-2 (e.g., refer to FIG. 12) may be formed within a first display area DA1 (e.g., refer to FIG. 12) and first driving circuit parts PC1 and third driving circuit parts PC1-2 may be alternately arranged in the third display area DA1-2 (e.g., refer to FIG. 12). Thus, the boundary part may not be clearly visible.

In case that the first display area DA1 is displayed with a lower luminance than the second display area DA2, the third display area DA1-2 including the third driving circuit parts PC1-2 having the relatively large boost capacitor (e.g., the third boost capacitor Cnb-3 of FIG. 11B) may be formed to be in contact with the second display area DA2 within the first display area DA1 to display the high luminance compared with the remaining first display area DA1-1. For example, in case that the luminance of the first display area DA1 is lower than the luminance of the second display area DA2, the third boost capacitor Cnb-3 may be disposed in the third display area DA1-2 to compensate (or buffer) the luminance difference between the first display area DA1 and the second display area DA2. Thus, the boundary with the second display area DA2 may not be visible.

Hereinafter, with reference to FIGS. 15 to 16C, a luminance of a second display area DA2 may be displayed at a low luminance and a luminance of a first display area DA1 may be displayed at a high luminance. A third display area DA2-2 may be formed in the second display area DA2, and may be in contact with the first display area DA1.

FIG. 15 is a schematic view showing a pixel arrangement of a display panel according to another embodiment.

Each quadrangle shown in FIG. 15 denotes a driving circuit part PC. Quadrangles of FIG. 15 may include three driving circuit parts PC1, PC2-2, and PC2.

In FIG. 15, a second display area DA2 may include a third display area DA2-2 disposed in a portion of the second display area DA2 in contact with a first display area DA1. Second pixels formed in a normal second display area DA2-1 may be formed in another part (or portion) of the second display area DA2. In the third display area DA2-2, driving circuit parts PC2 and PC2-2 corresponding to second and third pixels, respectively, may be alternately formed. The second driving circuit part PC2 included in each of the second pixels and the third driving circuit part PC2-2 included in each of the third pixels may be identically formed except for a magnitude (e.g., capacity) of a boost capacitor. For example, a magnitude (e.g., capacity) of a capacitance of a third boost capacitor Cnb-3 of the third driving circuit part PC2-2 may be greater than a magnitude (e.g., capacity) of a capacitance of a second boost capacitor Cnb-2 (e.g., refer to FIG. 11C) of the second driving circuit part PC2. An additional overlapping area may be formed in the third boost capacitor Cnb-3 (e.g., refer to FIG. 11B) of the third driving circuit part PC2-2 compared to the second boost capacitor Cnb-2 of the second driving circuit part PC2. For example, the additional overlapping area may be formed in the third boost capacitor Cnb-3 of the third driving circuit part PC2-2, and may not be formed in the second boost capacitor Cnb-2 of the second driving circuit part PC2.

Comparing the first driving circuit part PC1 of the first pixel of the first display area DA1 and the second driving circuit part PC2 of the second pixel of the second display area DA2, an area of the second driving circuit part PC2 may be four times an area of the first driving circuit part PC1. As a result, a magnitude (e.g., size) of a driving transistor T1 (e.g., refer to FIG. 11A) of the first driving part PC1 may be greater than a magnitude (e.g., size) of a driving transistor (e.g., refer to FIG. 11C) of the second driving part PC2 by four times. A capacitance of a capacitor (e.g., first boost capacitor Cnb-1) of the first driving circuit part PC1) may be greater than a capacitance of a capacitor (e.g., second boost capacitor Cnb-2) of the second driving circuit part PC2) by about four times. In FIG. 15, an area of the third driving circuit part PC2-2 may be the same as an area of the second driving circuit part PC2. The magnitude (e.g., size) of the driving transistor T1 and the capacitance of the capacitor (e.g., first boost capacitor Cnb-1 of FIG. 11A) of the first driving circuit part PC1 may be greater than a magnitude (e.g., size) of a driving transistor T1 and a capacitance of a capacitor (e.g., third boost capacitor Cnb-3 of FIG. 11B) of a third driving circuit part PC2-2 by about four times.

Therefore, the magnitude (e.g., the length and/or the width of the channel) of the driving transistors T1 (e.g., refer to FIGS. 11B and 11C) of the second driving circuit part PC2 and the third driving circuit part PC2-2 may be formed to be twice or more than that of the driving transistor T1 (e.g., refer to FIG. 11A) of the first driving circuit part PC1. The magnitude of the driving transistor T1 (e.g., refer to FIG. 11B) of the second driving circuit part PC2 and the magnitude of the driving transistor T1 (e.g., refer to FIG. 11C) of the third driving circuit part PC2-2 may have substantially a same value.

The capacitance magnitude of the boost capacitors Cnb-2 and Cnb-3 (e.g., refer to FIGS. 11B and 11C) of the second driving circuit part PC2 and the third driving circuit part PC2-2 may be formed to be twice or more than that of the boost capacitor Cnb-1 (e.g., refer to FIG. 11A) of the first driving circuit part PC1. The capacitance magnitude of the third boost capacitor Cnb-3 (e.g., refer to FIG. 11B) of the third driving circuit part PC2-2 may be greater than the capacitance magnitude of the second boost capacitor Cnb-2 (e.g., refer to FIG. 11C) of the second driving circuit part PC2.

In the above structure, for a same data voltage DATA, the third driving circuit part PC2-2 may generate the larger current than the second driving circuit part PC2 to be transmitted to a connected light-emitting element, and each of the third driving circuit part PC2-2 and the second driving circuit part PC2 is electrically connected to multiple light-emitting elements. Thus, a current may be divided and applied to each light-emitting element to display an image of a luminance. The luminance displayed by the second light-emitting element ED2 electrically connected to the second driving circuit part PC2 may be darker than the luminance displayed by the first light-emitting element ED1 in the first display area DM. The third display area DA2-2 of FIG. 15 may include the third driving circuit part PC2-2 that display the relatively bright luminance with respect to the same data voltage DATA. Thus, the luminance difference between the normal second display area DA2-1 and the first display area DA1 may be reduced to prevent a user from recognizing a boundary part. Since the third driving circuit part PC2-2 includes the third boost capacitor Cnb-3 that is greater than the second driving circuit part PC2, the third boost capacitor Cnb-3 may lower (or decrease) a voltage of a gate electrode of the driving transistor T1 to increase an output current of the driving transistor T1.

In FIG. 15, the driving circuit parts PC2 and PC2-2 may respectively correspond to the second pixel and the third pixel, and may be alternately formed in the third display area DA2-2. Various embodiments, in which the luminance of the second display area DA2 is lower than that of the first display area DA1 and the third display area is positioned within the second display area DA2 are disclosed with reference to FIGS. 16A to 16C besides the embodiment of FIG. 15.

FIGS. 16A to 16C are views schematically showing a pixel arrangement of a display panel according to various embodiments.

In FIGS. 16A to 16C, a part shown by a dotted line may correspond to the third display area DA2-2 of FIG. 15.

In FIG. 16A, second driving circuit parts PC2 and third driving circuit parts PC2-2 may be arranged in a 2×1 matrix form and alternately and repeatedly formed in each driving circuit part in a third display area DA2-2 (e.g., refer to FIG. 15). In FIG. 16B, second driving circuit parts PC2 and third driving circuit parts PC2-2 may be arranged in a 1×2 matrix form and alternately and repeatedly formed in each driving circuit part in a third display area DA2-2. In FIG. 16C, second driving circuit parts PC2 and third driving circuit parts PC2-2 may be alternately disposed by a row in a third display area DA2-2, and the third driving circuit parts PC2-2 may be positioned in a portion of the third display area DA2-2 in contact with a first display area DA1 (e.g., refer to FIG. 15).

FIGS. 16A to 16C shows the various embodiments. However, the disclosure is not limited thereto. The second driving circuit parts PC2 and the third driving circuit parts PC2-2 may be arranged in the third display area DA2-2 in various ways.

In the above-described embodiments, the third display area may be formed in the display area with low display luminance, and the large boost capacitor may be included in the third driving circuit part. However, the disclosure is not limited thereto. In case that the boost capacitor included in the third driving circuit part is formed to be relatively small, the third display area may be formed in a region with high display luminance.

Hereinafter, planar and cross-sectional structures of the specific driving circuit part PC are described in detail with reference to FIGS. 17 to 19.

Figure 17:
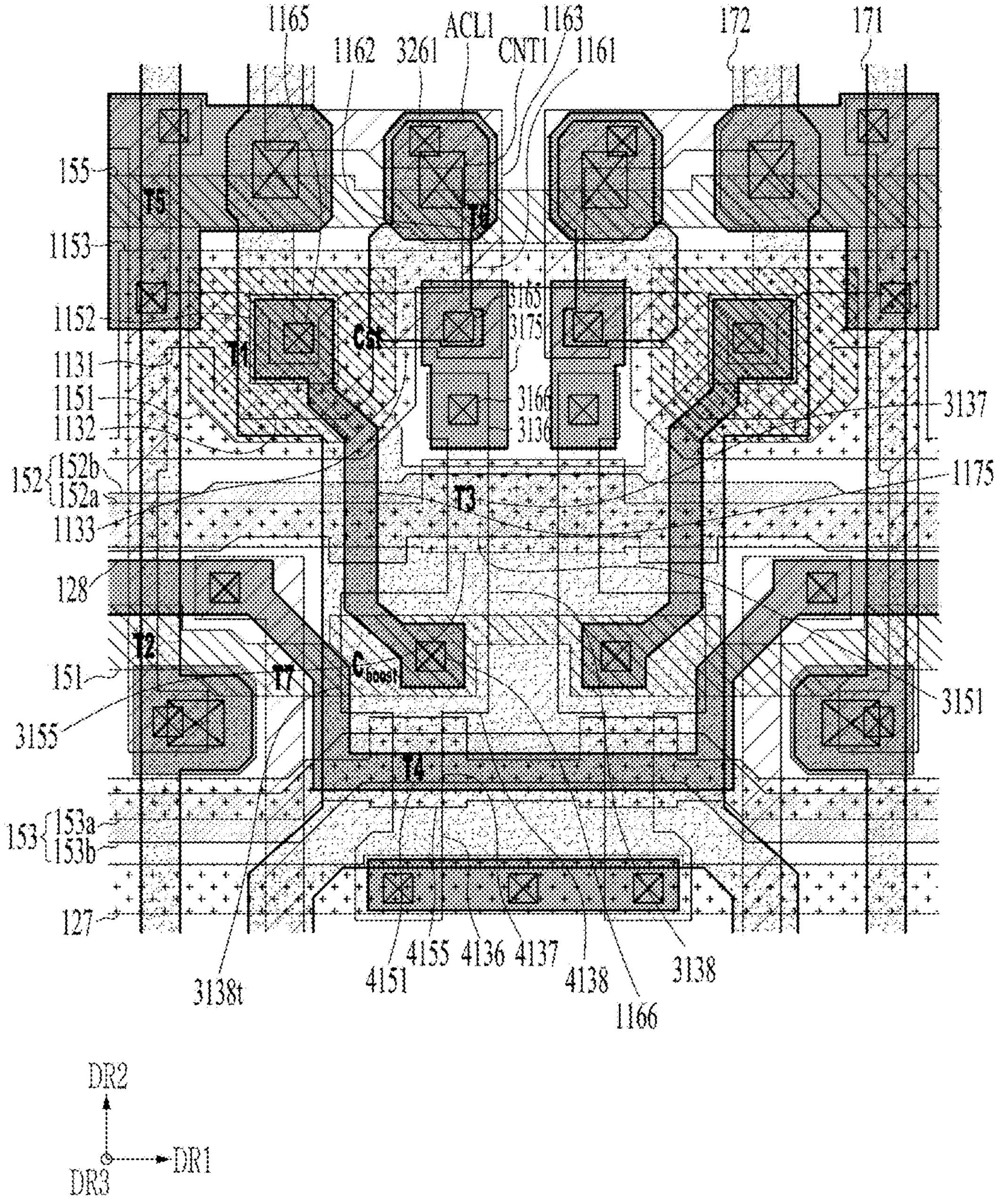
FIG. 17 is a schematic plan view of a driving circuit part positioned in a first display area on a display panel according to an embodiment.
Figure 18:
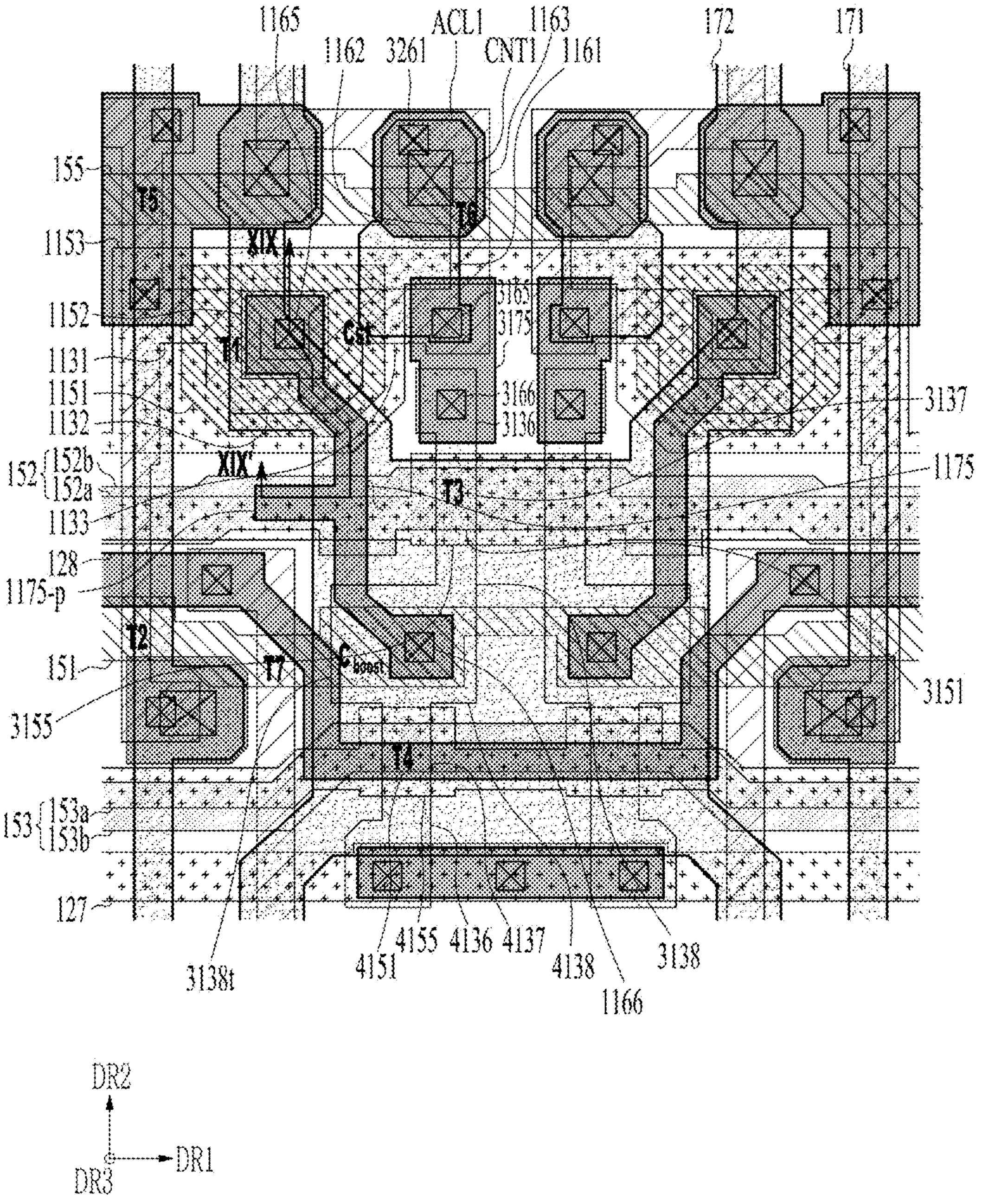
FIG. 18 is a schematic plan view of a driving circuit part positioned in a middle region of a display panel according to an embodiment.
Figure 19:
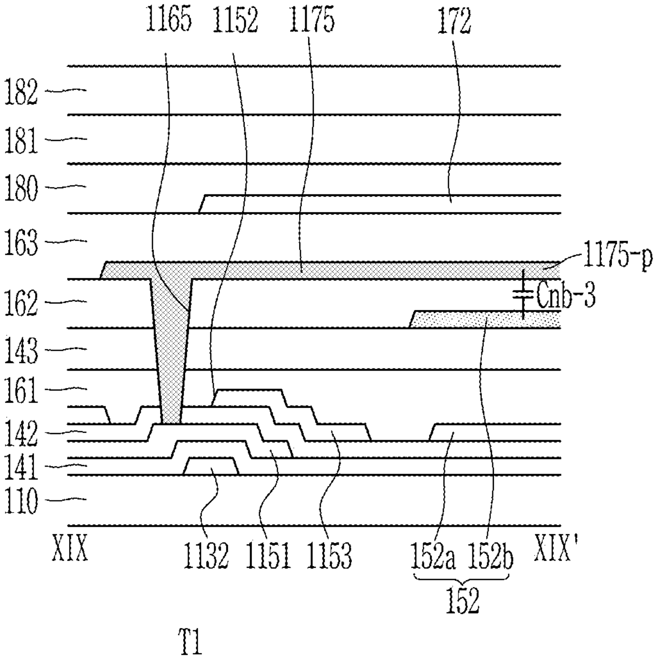
FIG. 19 is a schematic cross-sectional view taken along line XIX-XIX' of FIG. 18.

FIG. 17 shows the planar structure of the first driving circuit part PC1 (e.g., refer to FIG. 15) or the second driving circuit part PC2 (e.g., refer to FIG. 15), and FIGS. 18 and 19 show the planar and cross-sectional structures of the third driving circuit parts PC1-2 (e.g., refer to FIG. 12) and PC2-2 (e.g., refer to FIG. 15). For FIG. 17, in the larger area in the case of the second driving circuit part PC2 than in the case of the first driving circuit part PC1, since the structure of FIG. 17 is formed, even if the same structure of FIG. 17 is formed, there is a substantial difference due to the difference in the area of the second driving circuit part PC2 and the first driving circuit part PC1. For example, in case that the same planar structure of FIG. 17 is applied to both of the second driving circuit part PC2 and the first driving circuit part PC1, the second driving circuit part PC2 and the first driving circuit part PC1 may have different sizes to have different characteristics (e.g., electrical characteristics) from each other. In the structure of FIG. 18, a size of third driving circuit parts disposed in a second display area may be greater than a size of third driving circuit parts disposed in a first display area, and the third driving circuits in the second display area and the first display area may have a substantial difference at least in the structure thereof.

Hereinafter, the structure of the first driving circuit part PC1 or the second driving circuit part PC2 is described with reference to FIG. 17.

FIG. 17 is a schematic plan view of a driving circuit part positioned in a first display area on a display panel according to an embodiment.

A first semiconductor layer may be a polycrystalline semiconductor layer, and formed of a silicon semiconductor. The first semiconductor layer may be positioned on a substrate 110. The first semiconductor layer may include a channel 1132, a first region 1131, and a second region 1133 of a driving transistor T1 (e.g., refer to FIG. 11A). The first semiconductor layer may further include channels of a second transistor T2, a fifth transistor T5, a sixth transistor T6, and a seventh transistor T7 (e.g., refer to FIG. 11A). The first semiconductor layer may have regions (e.g., conductive layer) having electric conductivity by plasma processing or doping impurities on sides (e.g., both sides) of each channel, and the conductive regions of the first semiconductor layer may be a first electrode and a second electrode. The substrate 110 may have a rigid characteristic and include a rigid material (e.g., glass) that does not bend. or a flexible material (e.g., plastic or polyimide) that may be bent.

The channel 1132 of the driving transistor T1 (e.g., refer to FIG. 11A) may be bent to have a U-shape in a plan view. However, the shape of channel 1132 of the driving transistor T1 is not limited thereto, and may be variously changed. For example, the channel 1132 of the driving transistor T1 may be bent into different shapes or may have a bar shape. The first region 1131 and the second region 1133 of the driving transistor T1 may be positioned on sides (e.g., both sides) of the channel 1132 of the driving transistor T1. The first region 1131 and the second region 1133 positioned in the first semiconductor layer may serve as (or be implemented with) the first electrode and the second electrode of the driving transistor T1. The first region 1131 of the driving transistor T1 may extend in an up-down direction (or second direction DR2). A part (or portion) of the first region 1131 extending downward may be electrically connected to a second electrode of the second transistor T2 (e.g., refer to FIG. 11A). Another part (or portion) of the first region 1131 extending upward may be electrically connected to a second electrode of the fifth transistor T5 (e.g., refer to FIG. 11A). The second region 1133 of the driving transistor T1 may extend upward in a plan view to be electrically connected to a first electrode of the sixth transistor T6, and extend downward to be electrically connected to the third transistor T3 (e.g., refer to FIG. 11A).

A first gate insulating layer 141 (e.g., refer to FIG. 19) may be positioned on the first semiconductor layer including the channel 1132, the first region 1131, and the second region 1133 of the driving transistor T1. The first gate insulating layer 141 may include at least one inorganic insulating material of a silicon nitride ($SiN_x$), a silicon oxide ($SiO_x$), and a silicon oxynitride ($SiO_xN_y$).

A first gate conductive layer may include a gate electrode 1151 of the driving transistor T1 (e.g., refer to FIG. 11A). The first gate conductive layer may be positioned on the first gate insulating layer 141 (e.g., refer to FIG. 19). The first gate conductive layer may further include a gate electrode of each of the second transistor T2, the fifth transistor T5, the sixth transistor T6, the seventh transistor T7, and a lower boost electrode of an additional boost capacitor Cboost (e.g., refer to FIG. 11A). The gate electrode 1151 of the driving transistor T1 may overlap the channel 1132 of the driving transistor T1 in a plan view. The channel 1132 of the driving transistor T1 may be covered by the gate electrode 1151 of the driving transistor T1.

The first gate conductive layer may further include a first scan line 151 and a light emission control line 155. The first scan line 151 and the light emission control line 155 may extend approximately in a horizontal direction (or first direction DR1). The first scan line 151 may be electrically connected to the gate electrode of the second transistor T2. The first scan line 151 and the gate electrode of the second transistor T2 (e.g., refer to FIG. 11A) may be integral with each other. The first scan line 151 may also be electrically connected to a gate electrode of the seventh transistor T7 (e.g., refer to FIG. 11A). A gate electrode of the fifth transistor T5 and a gate electrode of the sixth transistor T6 (e.g., refer to FIG. 11A) may be electrically connected to the light emission control line 155.

After forming the first gate conductive layer including the gate electrode 1151 of the driving transistor T1 (e.g., refer to FIG. 11A), a plasma treatment or doping process may be performed, and an exposed region of the first semiconductor layer may become electrically conductive. For example, the first semiconductor layer covered by the first gate conductive layer may not be electrically conductive, and a portion of the first semiconductor layer, which is not covered by the first gate conductive layer, may have the same characteristic (e.g., electrical conductivity) as the conductive layer. As a result, the transistor including the conductive portion may have an electrical characteristic of a p-type transistor, and the driving transistor T1, the second transistor T2, the fifth transistor T5, the sixth transistor T6, and the seventh transistor T7 (e.g., refer to FIG. 11A) may be p-type transistors.

A second gate insulating layer 142 (e.g., refer to FIG. 19) may be positioned on the first gate conductive layer including the gate electrode 1151 of the driving transistor T1 (e.g., refer to FIG. 11A) and the first gate insulating layer 141 (e.g., refer to FIG. 19). The second gate insulating layer 142 may include at least one inorganic insulating material such as a silicon nitride ($SiN_x$), a silicon oxide ($SiO_x$), and a silicon oxynitride ($SiO_xN_y$).

A second gate conductive layer may include a first storage electrode 1153 of a storage capacitor Cst (e.g., refer to FIG. 11A), a lower shielding layer 3155 of the third transistor T3 (e.g., refer to FIG. 11A), and a lower shielding layer 4155 of the fourth transistor T4 (e.g., refer to FIG. 11A) may be positioned on the second gate insulating layer 142 (e.g., refer to FIG. 19). The lower shielding layers 3155 and 4155 may be positioned below channels of the third transistor T3 and the fourth transistor T4, respectively, and may shield (or protect) optical or electromagnetic interference from being provided to the channels from a lower side thereof.

The first storage electrode 1153 may overlap the gate electrode 1151 of the driving transistor T1 in a plan view to form the storage capacitor Cst (e.g., refer to FIG. 11A). The first storage electrode 1153 of the storage capacitor Cst may include an opening 1152 and extend in the horizontal direction (e.g., the first direction DR1). The first storage electrode 1153 of the storage capacitor Cst may be electrically connected to an adjacent first storage electrode 1153. The opening 1152 of the first storage electrode 1153 of the storage capacitor Cst may overlap the gate electrode 1151 of the driving transistor T1 in a plan view. The lower shielding layer 3155 of the third transistor T3 (e.g., refer to FIG. 11A) may overlap a channel 3137 and a gate electrode 3151 of the third transistor T3 in a plan view. The lower shielding layer 4155 of the fourth transistor T4 may overlap a channel 4137 and a gate electrode 4151 of the fourth transistor T4 (e.g., refer to FIG. 11A) in a plan view.

The second gate conductive layer may further include a lower second scan line 152*a*, a lower initialization control line 153*a*, and a first initialization voltage line 127. The lower second scan line 152*a*, the lower initialization control line 153*a*, and the first initialization voltage line 127 may extend in an approximately horizontal direction (e.g., the first direction DR1). The lower second scan line 152*a* may be electrically connected to the lower shielding layer 3155 of the third transistor T3 (e.g., refer to FIG. 11A). The lower second scan line 152*a* and the lower shielding layer 3155 of the third transistor T3 may be integral with each other. The lower initialization control line 153*a* may be electrically connected to the lower shielding layer 4155 of the fourth transistor T4 (e.g., refer to FIG. 11A). The lower initialization control line 153*a* and the lower shielding layer 4155 of the fourth transistor T4 may be integral with each other.

A first interlayer insulating layer 161 (e.g., refer to FIG. 19) may be positioned on the second gate conductive layer including the first storage electrode 1153 of the storage capacitor Cst (e.g., refer to FIG. 11A), the lower shielding layer 3155 of the third transistor T3, and the lower shielding layer 4155 of the fourth transistor T4 (e.g., refer to FIG. 11A). The first interlayer insulating layer 161 may include at least one inorganic insulating material such as a silicon nitride ($SiN_x$), a silicon oxide ($SiO_x$), and a silicon oxynitride ($SiO_xN_y$), and the inorganic insulating material may be formed to be relatively thick according to an embodiment. However, an organic material may be included in the first interlayer insulating layer 161 according to the embodiment.

An oxide semiconductor layer may include a channel 3137, a first region 3136, and a second region 3138 of the third transistor T3 (e.g., refer to FIG. 11A), and a channel 4137, a first region 4136, and a second region 4138 of the fourth transistor T4 (e.g., refer to FIG. 11A). The oxide semiconductor layer may be positioned on the first interlayer insulating layer 161. The oxide semiconductor layer may include an upper boost electrode of an additional boost capacitor Cboost.

The channel 3137, the first region 3136, and the second region 3138 of the third transistor T3 (e.g., refer to FIG. 11A), and the channel 4137, the first region 4136, and the second region 4138 of the fourth transistor T4 (e.g., refer to FIG. 11A) may be electrically connected to each other to be integral with one another. The first region 3136 and the second region 3138 of third transistor T3 may be positioned on sides (e.g., both sides) of the channel 3137 of the third transistor T3. The first region 4136 and the second region 4138 of the fourth transistor T4 may be positioned on sides (e.g., both sides) of the channel 4137 of the fourth transistor T4. The second region 3138 of the third transistor T3 may be electrically connected to the second region 4138 of the fourth transistor T4. The channel 3137 of the third transistor T3 may overlap the lower shielding layer 3155, and the channel 4137 of the fourth transistor T4 may overlap the lower shielding layer 4155 in a plan view.

The additional boost capacitor Cboost may be positioned on a portion where the oxide semiconductor layer and the first scan line 151 overlap each other in a plan view.

A third gate insulating layer 143 (e.g., refer to FIG. 19) may be positioned on the oxide semiconductor layer including the channel 3137, the first region 3136, and the second region 3138 of the third transistor T3 (e.g., refer to FIG. 11A), the channel 4137, the first region 4136, and the second region 4138 of the fourth transistor T4 (e.g., refer to FIG. 11A), and an upper boost electrode 3138*t* of the additional boost capacitor Cboost.

The third gate insulating layer 143 (e.g., refer to FIG. 19) may be positioned on the surface (e.g., entire surface) of the oxide semiconductor layer and the first interlayer insulating layer 161. Accordingly, the third gate insulating layer 143 may cover upper surfaces and sides of the channel 3137, the first region 3136, and the second region 3138 of the third transistor T3, the channel 4137, the first region 4136, and the second region 4138 of the fourth transistor T4, and the upper boost electrode of the additional boost capacitor Cboost. However, the embodiment is not limited thereto, and the third gate insulating layer 143 may not be positioned on the entire surface of the oxide semiconductor layer and the first interlayer insulating layer 161. For example, the third gate insulating layer 143 may overlap the channel 3137 of the third transistor T3 and may not overlap the first region 3136 and the second region 3138 in a plan view. Also, the third gate insulating layer 143 may overlap the channel 4137 of the fourth transistor T4 and may not overlap the first region 4136 and the second region 4138 in a plan view.

A third gate conductive layer may include the gate electrode 3151 of the third transistor T3, the gate electrode 4151 of the fourth transistor T4 (e.g., refer to FIG. 11A), and lower electrodes of the boost capacitors Cnb-1 and Cnb-2. The third gate conductive layer may be positioned on the third gate insulating layer 143 (e.g., refer to FIG. 19).

The gate electrode 3151 of the third transistor T3 may overlap the channel 3137 of the third transistor T3 in a plan view. The gate electrode 3151 of the third transistor T3 may overlap the lower shielding layer 3155 of the third transistor T3 in a plan view.

The gate electrode 4151 of the fourth transistor T4 (e.g., refer to FIG. 11A) may overlap the channel 4137 of the fourth transistor T4 in a plan view. The gate electrode 4151 of the fourth transistor T4 may overlap the lower shielding layer 4155 of the fourth transistor T4 in a plan view.

The third gate conductive layer may further include an upper second scan line 152*b* and an upper initialization control line 153*b*.

The upper second scan line 152*b* and the upper initialization control line 153*b* may extend in an approximately horizontal direction (e.g., the first direction DR1). The upper second scan line 152*b* and the lower second scan line 152*a* may form the second scan line 152. The upper second scan line 152*b* may be electrically connected to the gate electrode 3151 of the third transistor T3 (e.g., refer to FIG. 11A). The upper second scan line 152*b* and the gate electrode 3151 of the third transistor T3 may be integral with each other. A portion of the upper second scan line 152*b* may constitute the lower electrodes of the boost capacitors Cnb-1 and Cnb-2 (e.g., refer to FIGS. 11A and 11C). The upper initialization control line 153*b* and the lower initialization control line 153*a* may constitute (or form) the initialization control line 153. The upper initialization control line 153*b* may be electrically connected to the gate electrode 4151 of the fourth transistor T4. The upper initialization control line 153*b* and the gate electrode 4151 of the fourth transistor T4 may be integral with each other.

After forming the third gate conductive layer including the gate electrode 3151 of the third transistor T3 (e.g., refer to FIG. 11A) and the gate electrode 4151 of the fourth transistor T4 (e.g., refer to FIG. 11A), a part (or portion) of the oxide semiconductor layer covered by the third gate conductive layer may be formed into the channel, and another part (or portion) of the oxide semiconductor layer not covered by the third gate conductive layer may have electrical conductivity through a plasma treatment or doping process. The channel 3137 of the third transistor T3 may be positioned under the gate electrode 3151 to overlap the gate electrode 3151 in a plan view. The first region 3136 and the second region 3138 of the third transistor T3 may not overlap the gate electrode 3151 in a plan view. The channel 4137 of the fourth transistor T4 may be positioned under the gate electrode 4151 to overlap the gate electrode 4151 in a plan view. The first region 4136 and the second region 4138 of the fourth transistor T4 may not overlap the gate electrode 4151 in a plan view. The upper boost electrode 3138*t* may not overlap the third gate conductive layer in a plan view. The transistor including an oxide semiconductor layer may have electrical characteristics of an n-type transistor.

A second interlayer insulating layer 162 (e.g., refer to FIG. 19) may be positioned on the third gate conductive layer including the gate electrode 3151 of the third transistor T3 (e.g., refer to FIG. 11A) and the gate electrode 4151 of the fourth transistor T4. The second interlayer insulating layer 162 may have a single-layer or a multi-layered structure. The second interlayer insulating layer 162 may include at least one inorganic insulating material such as a silicon nitride ($SiN_x$), a silicon oxide ($SiO_x$), and a silicon oxynitride ($SiO_xN_y$). The second interlayer insulating layer 162 may include an organic material according to an embodiment. The second interlayer insulating layer 162 may include a first opening 1165, a second opening 1166, a third opening 3165, and a fourth opening 3166.

The first opening 1165 may overlap at least a portion of the gate electrode 1151 of the driving transistor T1 (e.g., refer to FIG. 11A) in a plan view. The first opening 1165 may also be formed in the third gate insulating layer 143, the first interlayer insulating layer 161 (e.g., refer to FIG. 19), and the second gate insulating layer 142 (e.g., refer to FIG. 19). The first opening 1165 may overlap the opening 1152 of the first storage electrode 1153 in a plan view. The first opening 1165 may be positioned inside the opening 1152 of the first storage electrode 1153.

The second opening 1166 may overlap at least a portion of the additional boost capacitor Cboost in a plan view. The second opening 1166 may be further formed in the third gate insulating layer 143 (e.g., refer to FIG. 19).

The third opening 3165 may overlap at least a portion of the second region 1133 of the driving transistor T1 in a plan view. The third opening 3165 may be further formed in the third gate insulating layer 143, the first interlayer insulating layer 161, the second gate insulating layer 142, and the first gate insulating layer 141 (e.g., refer to FIG. 19).

The fourth opening 3166 may overlap at least a portion of the first region 3136 of the third transistor T3 (e.g., refer to FIG. 11A) in a plan view. The fourth opening 3166 may be further formed in the third gate insulating layer 143 (e.g., refer to FIG. 19).

A first data conductive layer may include a first connection electrode 1175, a second connection electrode 3175, and upper electrodes of the boost capacitors Cnb-1 and Cnb-2 (e.g., refer to FIGS. 11A and 11C). The first data conductive layer may be positioned on the second interlayer insulating layer 162 (e.g., refer to FIG. 19).

The first connection electrode 1175 may overlap the gate electrode 1151 of the driving transistor T1 in a plan view. The first connection electrode 1175 may be electrically connected to the gate electrode 1151 of the driving transistor T1 through the first opening 1165 and the opening 1152 of the first storage electrode 1153.

A portion of the first connection electrode 1175 may constitute the boost capacitors Cnb-1 and Cnb-2 (e.g., refer to FIGS. 11A and 11C) and overlap the upper second scan line 152*b* in a plan view. As a result, a part of the upper second scan line 152*b* may constitute the lower electrode of the boost capacitors Cnb-1 and Cnb-2, and another part of the first connection electrode 1175 may form the upper electrode of boost capacitors Cnb-1 and Cnb-2.

The second connection electrode 3175 may overlap the second region 1133 of the driving transistor T1 in a plan view. The second connection electrode 3175 may be electrically connected to the second region 1133 of the driving transistor T1 through the third opening 3165. The second connection electrode 3175 may overlap the first region 3136 of the third transistor T3 in a plan view. The second connection electrode 3175 may be electrically connected to the first region 3136 of the third transistor T3 through the fourth opening 3166. Accordingly, the second region 1133 of the driving transistor T1 and the first region 3136 of the third transistor T3 may be electrically connected to each other by the second connection electrode 3175.

The first data conductive layer may further include a second initialization voltage line 128. The second initialization voltage line 128 may extend in approximately the horizontal direction (e.g., the first direction DR1).

A first organic layer 180 (e.g., refer to FIG. 19) may be positioned on the first data conductive layer including the first connection electrode 1175, the second connection electrode 3175, and the upper electrodes of the boost capacitors Cnb-1 and Cnb-2 (e.g., refer to FIGS. 11A and 11C). The first organic layer 180 may be formed of an organic material.

A second data conductive layer may include a data line 171 and a driving voltage line 172. The second data conductive layer may be positioned on the first organic layer 180 (e.g., refer to FIG. 19). The data line 171 and the driving voltage line 172 may extend in approximately a vertical direction (e.g., the second direction DR2). The data line 171 may be electrically connected to the second transistor T2 (e.g., refer to FIG. 11A). The driving voltage line 172 may be electrically connected to the fifth transistor T5 (e.g., refer to FIG. 11A). Also, the driving voltage line 172 may be electrically connected to the first storage electrode 1153.

Referring to FIG. 17, the second data conductive layer may additionally include an anode connecting member ACL1. The anode connecting member ACL1 may be electrically connected to the second region 1163 of the sixth transistor T6 exposed by an opening 3261 formed through the first organic layer 180 and the underlying insulating layer. The anode connecting member ACL1 may be exposed by the opening CNT1 and electrically connected to the anode (e.g., anode of light-emitting element).

A second organic layer 181 (e.g., refer to FIG. 19) and a third organic layer 182 (e.g., refer to FIG. 19) may be positioned on the second data conductive layer including the data line 171, the driving voltage line 172 and the anode connecting member ACL1. The second organic layer 181 and the third organic layer 182 may be formed of an organic material.

Although not shown in FIG. 17, an anode, an emission layer, and a cathode may be formed on the third organic layer 182 (e.g., refer to FIG. 19) to form a light-emitting element, and a barrier rib for separating adjacent light-emitting elements may also be positioned. For example, the anode may be positioned on the third organic layer 182. A pixel defining layer may be formed on the anode and overlap an end of the anode in a plan view. An opening formed through the pixel defining layer may expose the anode. The light-emitting element layer may be formed in the opening, and the cathode may be formed on the pixel defining layer and the light-emitting element layer. Thus, the light emitting element including the anode, the light-emitting element layer, and the cathode may be formed. An encapsulation layer may cover (or overlap) the cathode.

In the above-described embodiments, the planar structure of the first driving circuit part PC1 (e.g., refer to FIG. 4) of the first display area DA1 (e.g., refer to FIG. 4) or the second driving circuit part PC2 (e.g., refer to FIG. 4) of the second display area DA2 (e.g., refer to FIG. 4) may be described with reference to FIG. 17.

Hereinafter, the structure of the third driving circuit parts PC1-2 (e.g., refer to FIG. 12) and PC2-2 (e.g., refer to FIG. 15) of the third display areas DA1-2 (e.g., refer to FIG. 12) and DA2-1 (e.g., refer to FIG. 15) formed in the third display area is described with reference to FIGS. 18 and 19.

FIG. 18 is a schematic plan view of a driving circuit part positioned in a middle region of a display panel according to an embodiment, and FIG. 19 is a schematic cross-sectional view taken along line XIX-XIX' of FIG. 18.

The planar structure of FIG. 18 is different from that of FIG. 17 at least in that the portion (e.g., first connection electrode 1175) where the boost capacitors Cnb-1, Cnb-2, and Cnb-3 are positioned.

The third boost capacitor Cnb-3 which is different from FIG. 17 in detail is described below.

In FIG. 18, unlike FIG. 17, a protruded part 1175-*p* on which the first connection electrode 1175 is additionally protruded along the upper second scan line 152*b* in the horizontal direction (e.g., the first direction DR1) is formed. In FIG. 18, the entire protruded part 1175-*p* increases the capacitance value of the third boost capacitor Cnb-3 while overlapping the upper second scan line 152*b* in a plan view. For example, the lower electrode of the third boost capacitor Cnb-3 is a portion where the first connection electrode 1175 among the upper second scan line 152*b* and the protruded part 1175-*p* overlap in a plan view, and the upper electrode is positioned on the region overlapping the upper second scan line 152*b* among the first connection electrodes 1175 and the protruded part 1175-*p* in a plan view.

Referring to FIG. 19, third boost capacitor Cnb-3 (e.g., refer to FIG. 11C) may include a lower electrode, an upper electrode, and a dielectric layer. The lower electrode may use a part of the upper second scan line 152*b*. The upper electrode may use the first connection electrode 1175 and the protruded part 1175-*p*. The dielectric layer may use the second interlayer insulating layer 162 and positioned between the lower electrode and the upper electrode.

In the boost capacitors Cnb-1 and Cnb-2 (e.g., refer to FIGS. 11A and 11C) in FIG. 17, the lower electrode and the upper electrode may be respectively positioned on a part where the upper second scan line 152*b* and the first connection electrode 1175 overlap each other in a plan view. Therefore, a capacitance value of the third boost capacitor Cnb-3 (e.g., refer to FIG. 11B) of the third driving circuit parts PC1-2 (e.g., refer to FIG. 12) and PC2-2 (e.g., refer to FIG. 15) of FIG. 18 may be greater than a capacitance value of the third boost capacitor Cnb-3 of the third driving circuit parts PC1-2 and PC2-2 of FIG. 17 by the protruded part 1175-*p* protruded from the first connection electrode 1175.

According to the above-described embodiments, as shown in FIG. 18, the driving circuit part having the boost capacitor protruding in a direction may be the third driving circuit part. In some embodiments, the protruded boost capacitor may be included in the first driving circuit part or the second driving circuit part. However, the capacitance magnitude of the boost capacitor included in the third driving circuit part may be required to be greater than that of one of the boost capacitors included in the first driving circuit part and the second driving circuit part.

Hereinafter, the difference in luminance for three embodiments according to the magnitude of the protruded part constituting the boost capacitor is described with reference to FIGS. 20 to 22.

Three embodiments are separately described with reference to FIG. 20.

Figure 20:
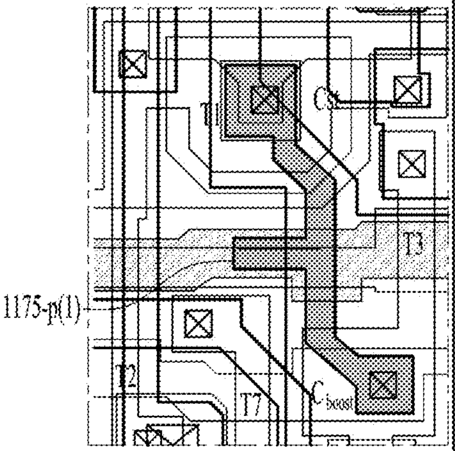
FIG. 20 is a schematic view showing a driving circuit part positioned in a middle region according to various embodiments.
Figure 20:
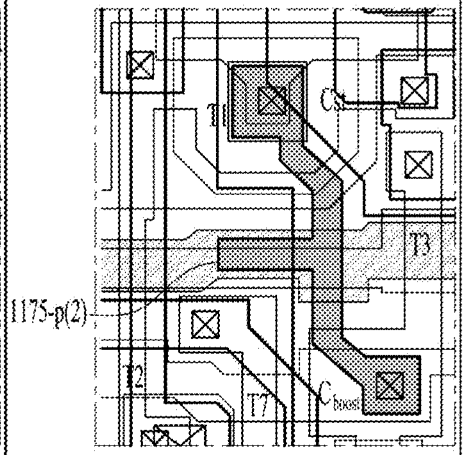
Figure 20:
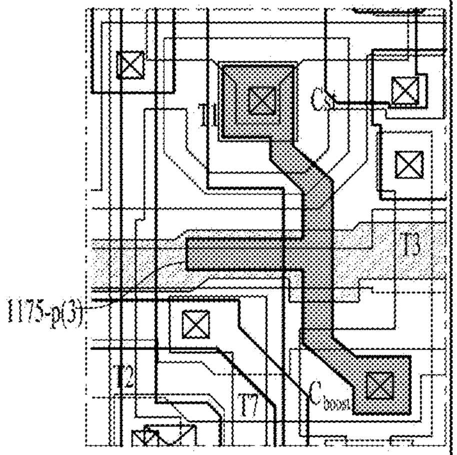

FIG. 20 is a schematic view showing a driving circuit part positioned in a middle region according to various embodiments.

A value of a capacitance of a boost capacitor included in third driving circuit parts PC1-2 (e.g., refer to FIG. 12) and PC2-2 (e.g., refer to FIG. 15) may increase from Embodiment 1 to Embodiment 3 shown in FIG. 20 because a first connection electrode 1175 has a protruded part 1175-*p* that is progressively greater. A driving transistors T1 included in the third driving circuit parts PC1-2 and PC2-2 may have a same magnitude. Capacitances of storage capacitors Cst may have a same magnitude (or capacitance). Other elements may also have a same magnitude.

The difference in characteristics of three embodiments is described with reference to FIGS. 21 and 22.

Figure 21:
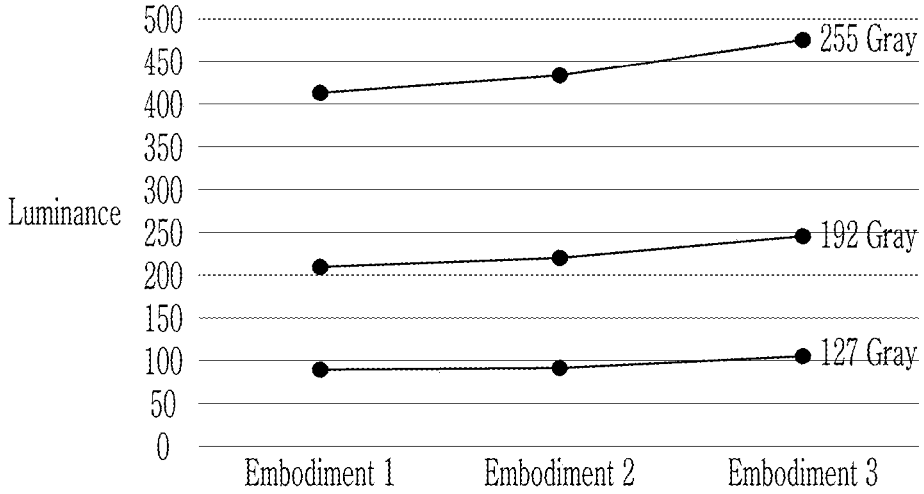
FIG. 21 is a schematic graph showing light emission luminance for an embodiment of FIG. 20.
Figure 22:
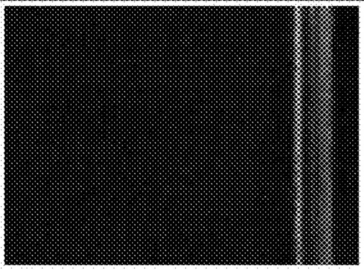
FIG. 22 is a schematic view taken a display image of a black of a boundary part in a display panel including an embodiment of FIG. 20.
Figure 22:
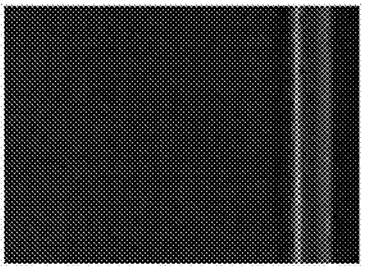
Figure 22:
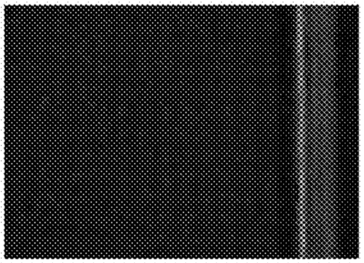

FIG. 21 is a schematic graph showing a light emission luminance for an embodiment of FIG. 20, and FIG. 22 is a schematic view taken a display image of a black of a boundary part in a display panel including an embodiment of FIG. 20.

In FIG. 21, in case that an image of 127 gray, an image of 192 gray, and an image of 255 gray for three embodiments may be displayed, and difference in luminance is shown as a graph. According to FIG. 21, in case that all elements of a driving circuit part have a same magnitude, the luminance for each gray may increase as the capacitance of a boost capacitor Cnb (e.g., refer to FIG. 20) increases. This is because the boost capacitor Cnb also lowers the voltage of the gate electrode of the driving transistor T1 in case that a low voltage is applied to a second scan signal GC[N] (e.g., refer to FIG. 11B) to change a third transistor T3 (e.g., refer to FIG. 20) from a turn-on state to a turn-off state, the boost capacitor Cnb may lower voltage of a gate electrode of a driving transistor T1. Thus, in case that the capacitance of the driving transistor T1 increases, the output current generated from the driving transistor T1 may be increased.

The display panel in which these three embodiments are respectively formed in the third display area is described with reference to FIG. 22.

In FIG. 22, in case that the display panel displays black, the luminance may be displayed due to the capacitance of the boost capacitor Cnb, but the display may be blurred between the first display area DA1 and the second display area DA2 as the capacitance of the boost capacitor Cnb increases. The black image is displayed in FIG. 22, and a little light may be emitted from a corresponding part (e.g., boundary part between first display area DA1 and second display area DA2) to be recognized. However, in other grays (or gray-scales), the boundary may not be recognized as the boundary part may be changed to a medium gray (or intermediate gray-scale).

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A light emitting display device comprising:

a non-display area;

a display area; and a scan driver generating a scan signal, wherein the display area includes:

a first pixel positioned in a first display area, the first pixel including:

a first driving circuit part including:
a first boost capacitor; and
a first driving transistor; and
a first light-emitting element;
a second pixel positioned in a second display area, the second pixel including:
a second driving circuit part including:
a second boost capacitor; and
a second driving transistor; and
a second light-emitting element; and
a third pixel positioned in a third display area positioned at a boundary part of the first display area and the second display area, the third pixel including:
a third driving circuit part including:
a third boost capacitor; and
a third driving transistor; and
a third light-emitting element,
wherein the scan driver transmits the scan signal to the first driving circuit part of the first pixel, the second driving circuit part of the second pixel, and the third driving circuit part of the third pixel,
wherein at least a part of the scan driver positioned in the display area,
wherein at least one of the second light-emitting element is positioned above the at least a part of the scan driver positioned in the display area, and
wherein the first boost capacitor, the second boost capacitor, and the third boost capacitor have different capacitance values.

2. The light emitting display device of claim 1, wherein the third boost capacitor has a capacitance value greater than a capacitance value of the first boost capacitor or a capacitance value of the second boost capacitor.

3. The light emitting display device of claim 2, wherein the first pixel is further positioned in the third display area.

4. The light emitting display device of claim 3, wherein the capacitance value of the third boost capacitor of the third pixel is greater than the capacitance value of the first boost capacitor of the first pixel.

5. The light emitting display device of claim 4, wherein
a magnitude of the second driving transistor of the second pixel is greater than a magnitude of the first driving transistor and a magnitude of the third driving transistor, and
the magnitude of the first driving transistor and the magnitude of the third driving transistor are equal to each other.

6. The light emitting display device of claim 2, wherein the second pixel is further positioned in the third display area.

7. The light emitting display device of claim 6, wherein the capacitance value of the third boost capacitor of the third pixel is greater than the capacitance value of the second boost capacitor of the second pixel.

8. The light emitting display device of claim 7, wherein
a magnitude of the second driving transistor of the second pixel is greater than a magnitude of the first driving transistor, and
the magnitude of the second driving transistor of the second pixel is equal to a magnitude of the third driving transistor.

9. The light emitting display device of claim 1, wherein the first pixel, the second pixel, and the third pixel each further include:
a second transistor transmitting a data voltage; and
a third transistor connecting a gate electrode and a second electrode of each of the first driving transistor, the second driving transistor, and the third driving transistor, and
each of the first boost capacitor, the second boost capacitor, and the third boost capacitor is formed between the gate electrode and the second electrode of the third transistor, and
each of the first boost capacitor, the second boost capacitor, and the third boost capacitor is also electrically connected to the gate electrode of each of the first driving transistor, the second driving transistor, and the third driving transistor.

10. The light emitting display device of claim 9, wherein
each of the first driving transistor, the second driving transistor, the third driving transistor, and the second transistor is a p-type transistor, and
the third transistor is an n-type transistor.

11. The light emitting display device of claim 2, wherein the second display area is divided into:
an overlapping region where the second driving circuit part and the second light-emitting element overlap each other in a plan view; and
a non-overlapping region where the second driving circuit part and the second light-emitting element do not overlap each other in a plan view.

12. The light emitting display device of claim 11, wherein the second light-emitting element positioned in the non-overlapping region overlaps the scan driver in a plan view.

13. The light emitting display device of claim 2, wherein the first light-emitting element, the second light-emitting element, and the third light-emitting element display a same color and have a same magnitude in a plan view.

14. The light emitting display device of claim 2, wherein the second driving circuit part is electrically connected to one or more of the second light-emitting element.

15. A light emitting display device comprising:
a polycrystalline semiconductor layer on a substrate;
a first gate conductive layer positioned over the polycrystalline semiconductor layer and electrically insulated from the polycrystalline semiconductor layer, the first gate conductive layer including a gate electrode of a driving transistor and a first scan line;
a second gate conductive layer positioned over the first gate conductive layer and electrically insulated from the first gate conductive layer, the second gate conductive layer including a first storage electrode for a storage capacitor;
an oxide semiconductor layer positioned over the second gate conductive layer and electrically insulated from the second gate conductive layer;
a third gate conductive layer positioned over the oxide semiconductor layer and electrically insulated from the oxide semiconductor layer, the third gate conductive layer including a second scan line;
a first data conductive layer positioned over the second gate conductive layer and electrically insulated from the second gate conductive layer, the first data conductive layer including a first connecting member electrically connecting the oxide semiconductor layer and the gate electrode of the driving transistor; and
a second data conductive layer electrically insulated from the first data conductive layer and positioned over the first data conductive layer, the second data conductive layer including a data line and a driving voltage line, wherein the first connecting member is extended in a different direction of an extending direction of the second scan line and the first connecting member further includes a protruded part extending in a corresponding direction of the extending direction of the second scan line and overlapping the second scan line in a plan view.

16. The light emitting display device of claim 15, wherein a boost capacitor is formed where the first connecting member, the protruded part, and the second scan line overlap each other in a plan view.

17. The light emitting display device of claim 16, wherein the first storage electrode has an opening, and the first connecting member is electrically connected to the gate electrode of the driving transistor through the opening.

18. The light emitting display device of claim 17, wherein the first storage electrode overlaps the gate electrode of the driving transistor in a plan view to form the storage capacitor.

19. The light emitting display device of claim 15, further comprising:

an anode positioned on the second data conductive layer, wherein the anode overlaps in a plan view a scan driver that generates a scan signal to the first scan line or the second scan line.

20. The light emitting display device of claim 15, wherein another first connecting member adjacent to the first connecting member does not have a protruded part extending along the second scan line as the protruded part of the first connecting member.

* * * * *